(12) United States Patent
Yeung et al.

(10) Patent No.: US 12,120,527 B2
(45) Date of Patent: Oct. 15, 2024

(54) METHODS AND SYSTEMS AT A PORTABLE GATEWAY OF SENDING AND RECEIVING INTERNET PROTOCOL (IP) DATA PACKETS THROUGH A WIRELESS GATEWAY

(71) Applicant: Pismo Labs Technology Limited, Kowloon (HK)

(72) Inventors: Yu Yeung, Kowloon (HK); Kwan Man Kit, New Territories (HK); Mok Kwok Yui, New Territories (HK)

(73) Assignee: Pismo Labs Technology Limited, Kowloon (HK)

( * ) Notice: Subject to any disclaimer, the term of this patent is extended or adjusted under 35 U.S.C. 154(b) by 0 days.

(21) Appl. No.: 17/912,487

(22) PCT Filed: Sep. 27, 2021

(86) PCT No.: PCT/IB2021/058769
§ 371 (c)(1),
(2) Date: Sep. 16, 2022

(87) PCT Pub. No.: WO2023/047160
PCT Pub. Date: Mar. 30, 2023

(65) Prior Publication Data
US 2024/0214820 A1    Jun. 27, 2024

(51) Int. Cl.
*H04L 67/02* (2022.01)
*H04L 67/289* (2022.01)
*H04W 12/60* (2021.01)

(52) U.S. Cl.
CPC ............. *H04W 12/66* (2021.01); *H04L 67/02* (2013.01); *H04L 67/289* (2013.01)

(58) Field of Classification Search
CPC ....... H04W 12/66; H04L 67/02; H04L 67/289
(Continued)

(56) References Cited

U.S. PATENT DOCUMENTS 10,419,908 B1 * 9/2019 Hutz ........................ H04W 4/50
10,805,155 B1 * 10/2020 Le ............................ G16Y 30/00
(Continued)

FOREIGN PATENT DOCUMENTS

| CN | 106304057 A | 1/2017 |
| CN | 107231271 A | 10/2017 |

(Continued)

OTHER PUBLICATIONS

International Search Report in International Application No. PCT/IB2021/058769, mailed on May 25, 2022.
(Continued)

*Primary Examiner* — Karen C Tang
(74) *Attorney, Agent, or Firm* — Hershkovitz & Associates, PLLC; Abe Hershkovitz

(57) ABSTRACT

The present invention discloses methods and systems of connecting a wide area network (WAN) to a portable gateway through at least one gateway. The portable gateway generates a web page where the web page comprises input fields that allow configuration of one or more WAN interfaces. The portable gateway stores the web page. The portable gateway receives one or more Internet Protocol (IP) data packets from at least one device. The IP data packets are not capable of being forwarded. The portable gateway sends the web page to the at least one device. The portable gateway receives information through the web page from the at least one device. The information is to configure at least one WAN interface and to connect to at least one gateway.

20 Claims, 16 Drawing Sheets

(58) Field of Classification Search
USPC .......................................................... 709/231
See application file for complete search history.

(56) References Cited

U.S. PATENT DOCUMENTS

| | | | |
|---|---|---|---|
| 11,050,631 B2* | 6/2021 | Rooney | ................... H04W 8/26 |
| 2014/0071849 A1 | 3/2014 | Huotari et al. | |
| 2018/0109419 A1* | 4/2018 | Schallich | ............ H04L 65/1069 |
| 2019/0327125 A1* | 10/2019 | Mcchord | ................ H04L 69/18 |
| 2022/0094750 A1* | 3/2022 | Kaippilly | ................ H04L 67/34 |
| 2022/0174473 A1* | 6/2022 | Rooney | .................... H04L 9/50 |

FOREIGN PATENT DOCUMENTS

| | | |
|---|---|---|
| CN | 110248364 A | 9/2019 |
| CN | 112350845 A | 2/2021 |
| JP | 2013055467 A | 3/2013 |

OTHER PUBLICATIONS

Written Opinion of the International Search Authority in International Application No. PCT/IB2021/058769, mailed on May 25, 2022.
English Language Abstract of CN 112350845 A (Feb. 9, 2021).
English Language Abstract of JP 2013055467 A (Mar. 21, 2013).
English Language Abstract of CN 106304057 A (Jan. 4, 2017).
English Language Abstract of CN 110248364 A (Sep. 17, 2019).
English Language Abstract of CN 107231271 A (Oct. 3, 2017).

* cited by examiner

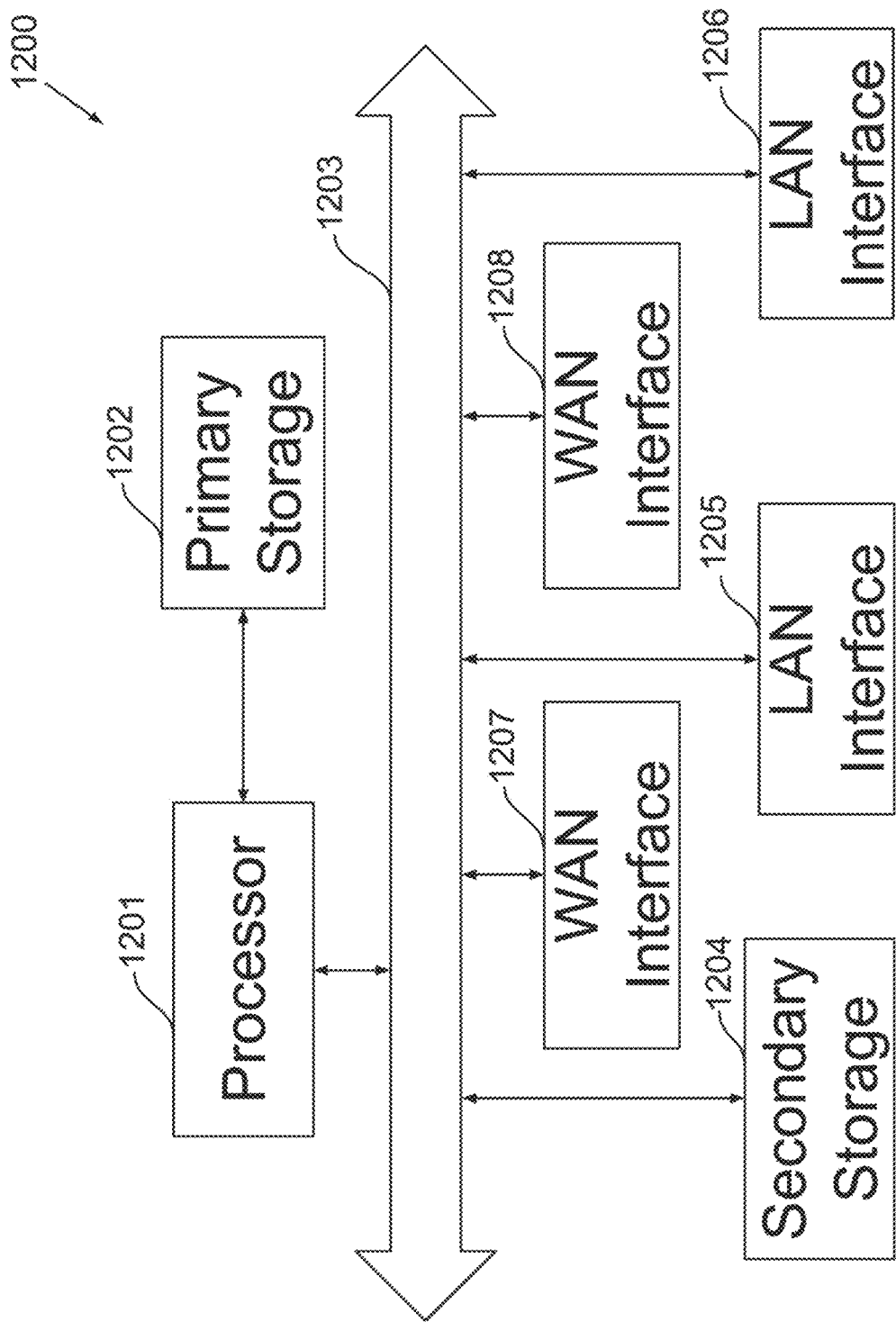

METHODS AND SYSTEMS AT A PORTABLE GATEWAY OF SENDING AND RECEIVING INTERNET PROTOCOL (IP) DATA PACKETS THROUGH A WIRELESS GATEWAY

TECHNICAL FIELD

The present invention relates to the field of computer networks. More particularly, the present invention relates to a method and system for configuring at least one wide area network (WAN) at a portable gateway.

BACKGROUND ART

A mobile device, such as a laptop or a smartphone, may access the internet through a wireless gateway. A wireless gateway may be a Wi-Fi router. When a mobile device moves from one location to another location, the mobile device may have to be re-configured for different wireless gateways. This is inconvenient. Some use a portable gateway to act as an intermediate router to allow one or more mobile devices to connect to the internet through the wireless gateway. This arrangement allows better security and less configuration for the mobile devices. However, the portable gateway still has to be re-configured for different wireless gateways. This is also inconvenient.

SUMMARY OF INVENTION

The present invention discloses methods and systems of connecting one or more wide area network (WAN) connections to a portable gateway through at least one wireless gateway. The portable gateway may generate and store web pages. The web pages comprise input fields that allow a user to provide configurations of one or more WAN interfaces of the portable gateway The portable gateway then configures the one or more WAN interfaces according to the configurations and availability of wireless gateways.

The portable gateway generates and stores a web page. The web page comprises input fields that allows to configure the one or more WAN interfaces of the portable gateway.

The portable gateway receives an Internet Protocol (IP) data packet from a device for forwarding. The received IP data packets are not capable of being forwarded.

The portable gateway generates responding IP data packets in response to the received IP data packets. The responding IP data packets comprise the web page. The portable gateway sends the responding IP data packets to the device.

The portable gateway receives information from the device through the web page. The information is based on information of a connection of the at least one wireless gateway.

The information of the connection is either obtained from an administrator of the at least one wireless gateway or retrieved by the portable gateway itself when the information of connection is stored previously.

The web page is a computer file written in a Hypertext Markup Language (HTML) or a comparable markup language According to one of the embodiments, the portable gateway stores the computer written file in a storage medium of the portable gateway.

According to one of the embodiments, the portable gateway is configured to detect if the at least one wireless gateway is Wi-Fi Protected Setup (WPS) enabled.

According to one of the embodiments, the portable gateway comprises a plurality of WAN interfaces and configures the plurality of WAN interfaces.

According to one of the embodiments, the portable gateway aggregates connections connected to the plurality of WAN interface. "SpeedFusion" technology may be implemented in aggregating the connections.

According to one of the embodiments, the portable gateway sends an IP data packet to the at least one wireless gateway when the portable gateway connects to at least one wireless gateway According to one of the embodiments, the portable gateway comprises a plurality of LAN interfaces and configures the plurality of LAN interfaces.

Although specific advantages have been enumerated above, various embodiments may include some, none, or all of the enumerated advantages. Additionally, other technical advantages may become readily apparent to one of ordinary skills in the art after review of the following figures and description.

BRIEF DESCRIPTION OF DRAWINGS

FIG. 12 is a block diagram illustrating the architecture of a portable gateway, according to one of the embodiments of the present invention.

DETAILED DESCRIPTION

Figure 1A:
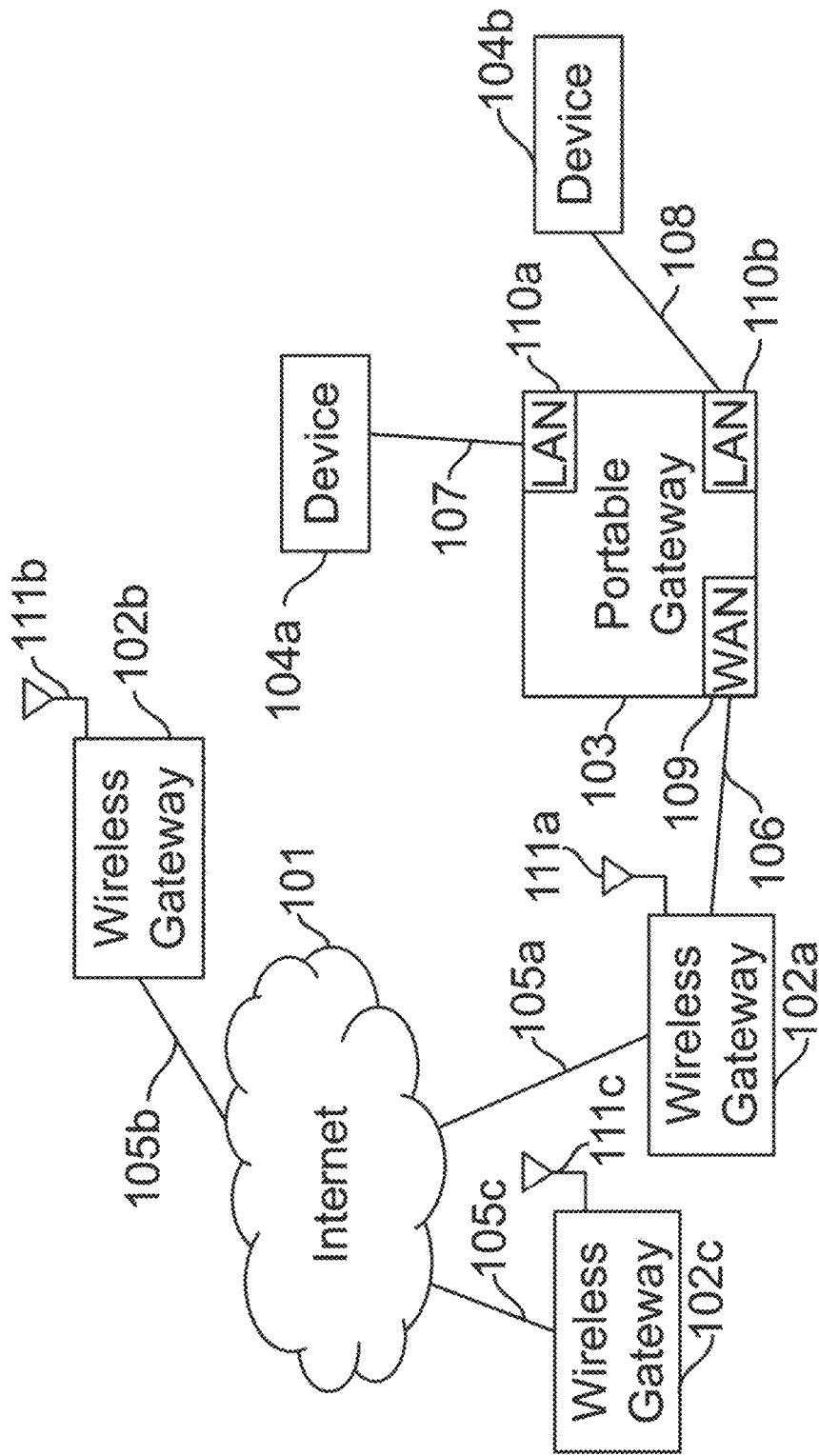
FIG. 1A illustrates a network environment according to various embodiments of the present invention.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Additionally, unless otherwise specifically noted, articles depicted in the drawings are not necessarily drawn to scale.

The ensuing description provides preferred exemplary embodiment only and is not intended to limit the scope, applicability, or configuration of the disclosure Rather, the ensuing description of the preferred exemplary embodiment will provide those skilled in the art with an enabling description for implementing a preferred exemplary embodiment of the disclosure. It is understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process that is illustrated as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Although the methods and apparatuses have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

Embodiments, or portions thereof, may be embodied in program instructions operable upon a processing unit for performing functions and operations as described herein. The program instructions making up the various embodiments may be stored in a non-transitory storage medium. Moreover, as disclosed herein, the term "non-transitory storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape. CD-ROM, flash memory devices, a memory card and/or other machine-readable mediums for storing information. The term "machine-readable medium" includes, but is not limited to, portable or fixed storage devices, optical storage mediums, magnetic mediums, memory chips or cartridges, wireless channels, and various other mediums capable of storing, containing, or carrying instruction and/or data. A machine-readable medium can be realized by virtualization and can be a virtual machine-readable medium, including a virtual machine-readable medium in a cloud-based instance.

The term "non-transitory computer-readable medium", "main memory", or "secondary storage", as used herein, refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to non-volatile media, volatile media, and transmission media. Non-volatile media includes, for example, optical or magnetic disks. Volatile media includes dynamic memory. Transmission media includes coaxial cables, copper wire, and fiber optics. Transmission media can also take the form of acoustic or light waves, such as those generated during radio-wave and infrared data communications.

A volatile storage may be used for storing temporary variables or other intermediate information during the execution of instructions by the processor/processing unit. A non-volatile storage or static storage may be used for storing static information and instructions for processors, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present disclosure. Furthermore, embodiments may be implemented by hardware, software, firmware, middleware, microcode, hardware description languages, or any combination thereof. When implemented in software, firmware, middleware, or microcode, the program instructions to perform the necessary tasks may be stored in a non-transitory computer-readable storage medium. A processing unit can be realized by virtualization and can be a virtual processing unit, including a virtual processing unit in a cloud-based instance.

Embodiments of the present disclosure are related to the use of a computer system for implementing the techniques described herein. In an embodiment, the disclosed processing units may reside on a machine such as a computer platform. According to one embodiment of the disclosure, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the disclosure. Thus, embodiments of the disclosure are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

Alternatively, hardwired circuitry may be used in place of, or in combination with, software instructions to implement processes consistent with the principles of the disclosure. Thus, implementations consistent with the principles of the disclosure are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a wireless communication interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable. DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WIMAX, GPRS, EDGE, GSM, CDMA, WI-FI, CDMA2000, WCDMA, TD-SCDMA, BLUETOOTH, WiBro, Evolution-Data Optimized (EV-DO): Digital Enhanced Cordless Telecommunications (DECT); Digital AMPS (IS-136/TDMA); Integrated Digital Enhanced (IDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, an optical signal, radio frequency or other wireless communication signals, etc. The code segments may, in certain embodiments, be downloaded via computer networks such as the Internet, an intranet, local area network (LAN), metropolitan area network (MAN), wide area network (WAN), the Public Switched Telephone Network (PSTN), a satellite communication system, a cable transmission system, and/or the like.

An information packet is a Protocol Data Unit (PDU) that contains control information, such as address information and user data. An information packet can be a network layer PDU such as Internet Protocol (IPv4 or IPV6), a transport layer PDU such as Transmission Control Protocol (TCP) or User Datagram Protocol (UDP) or PDU of any other protocol that is capable of carrying information over a communication link.

It should be understood that the detailed description and specific examples indicating exemplary embodiments are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A. B, or C" or "at least one of A, B. and C" is used in the claims or the specification, the phrase is intended to mean any of the following: (1) at least one of A; (2) at least one of B; (3) at least one of C; (4) at least one of A and at least one of B; (5) at least one of B and at least one of C: (6) at least one of A and at least one of C, or (7) at least one of A, at least one of B, and at least one of C.

FIG. 1A illustrates a network topology according to a plurality of embodiments of the present invention. In this embodiment, portable gateway 103 and wireless gateways 102a, 102b and 102c are networking devices that allow devices 104a and 104b to connect to a network, such as Internet 101. There is no limitation that portable gateway 103, wireless gateways 102a, 102b and 102c, and devices 104a and 104b are connected using respective wired connections. These connections may be wireless connections. A portable gateway then may be a wireless gateway, and a wireless gateway may be a portable gateway The only difference is that a portable gateway may be easily moved from one location to another location. Portable gateway 103 may be a networking device, such as a router, that forwards IP data packets between computer networks.

Devices 104a and 104b may be any electronic device, such as laptop, mobile phone, or desktop used directly by an end-user. There is no limitation on the number of portable gateway 103, wireless gateways 102, and devices 104.

Portable gateway 103 may have one WAN interface and one or more local area network (LAN) interfaces. One or more devices are allowed to connect to portable gateway 103 through any of the LAN interfaces. Portable gateway 103 is capable of connecting to any of the wireless gateways 102a. 102b or 102c by using corresponding WAN interface. Portable gateway 103 is then capable of connecting one or more devices to the internet 101 through wireless gateways 102a, 102b or 102c.

A plurality of devices, such as devices 104a and 104b, connect to portable gateway 103 through a plurality of connections, such as connections 107 and 108, by using LAN interfaces 110a and 110b respectively There is no limitation on the number of LAN interfaces 110a and 110b in portable gateway 103. There is also no limitation on the number of the connections 107 and 108. A LAN interface may be a wireless LAN interface, such as IEEE 802.11, that is capable of connecting to a plurality of devices.

Wireless gateways 102a. 102b and 102c are connected to internet 101 through connections 105a, 105b and 105c respectively. Connection 106 is provided by wireless gateway 102a. Wireless gateways 102b and 102c are also capable of providing connection. Moreover, wireless gateways 102a, 102b and 102c are capable of providing wireless connection through antennas 111a, 111b and 111c respectively.

Portable gateway 103 connects to wireless gateway 102a through connection 106 by using wide area network (WAN) interface 109. There is no limitation on the number of WAN interface 109 in portable gateway 103. WAN interface 109 may be configured by using Wi-Fi as WAN for any Wi-Fi connection.

There is no limitation on types of connection of each of the connections 105a, 105b, 105c, 106, 107 and 108. Connections 105a, 105b, 105c, 106, 107 and 108 may be wired or wireless connections. A wired connection is implemented using Ethernet, fiber optic, cable. DSL, frame relay, token ring, serial bus, USB, Firewire, PCI, or any material that can pass information. A wireless connection is implemented using infrared, High-Speed Packet Access (HSPA), HSPA+, Long Term Evolution (LTE), 5G, WIMax, GPRS, EDGE, GSM, CDMA, Wi-Fi, CDMA2000, WCDMA, TD-SCDMA, BLUETOOTH, WIBRO, Evolution-Data Optimized (EV-DO), Digital Enhanced Cordless Telecommunications (DECT), Digital AMPS (IS-136/TDMA), Integrated Digital Enhanced (IDEN) or any other wireless technologies.

Wireless gateway 102a has access to internet 101 through connection 105a. Once portable gateway 103 configures WAN interface 109, portable gateway 103 connects to wireless gateway 102a through connection 106 When portable gateway 103 connects to wireless gateway 102a, portable gateway 103 gets access to internet 101 through connection 106.

In one variant, as devices 104a and 104b are connected to portable gateway 103, a user of device 104a or 104b is allowed to configure WAN interface 109 of portable gateway 103.

In another variant, WAN interface 109 of portable gateway 103 is configured directly without devices 104a and 104b. In this variant, portable gateway 103 may have input/output (I/O) modules, such as touchscreen, button etc. In this variant, the user directly operates the portable gateway 103 through the I/O modules.

In another variant, the user of devices 104a and 104b is able to select a connection when there is more than one connection. More than one connection may be provided by wireless gateways 102b and 102c.

In another variant, a WAN interface, such as WAN interface 109 of portable gateway 103 is used to connect to wireless gateway 102a connection 106.

In another variant, one of the devices 104a and 104b is used to select the connection 106.

Figure 2A:
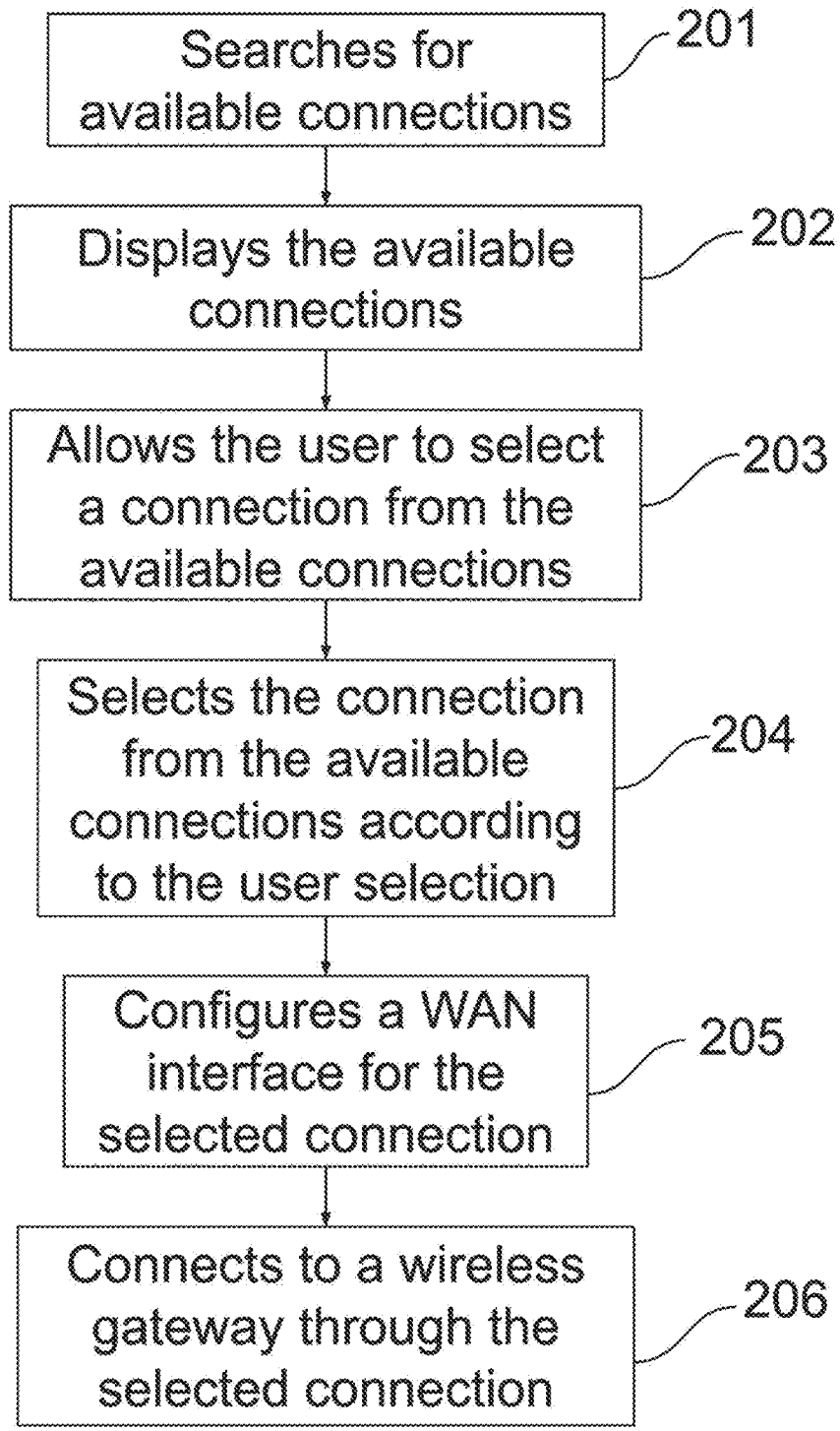
FIG. 2A is a flowchart illustrating a process according to one of the embodiments of the present invention.

FIG. 2A is a flowchart illustrating a process according to one of the embodiments of the present invention. FIG. 2A is viewed in conjunction with FIG. 1A for better understanding of the embodiments.

In a networking environment, there is a plurality of wireless connections and wired connections, represented as connection 106 in FIG. 1A. FIG. 2A is a process at portable gateway 103 to select a connection from the plurality of wireless connections and wired connections. Portable gateway 103 is configured to search for available connections. Available connections are displayed in a form of a web page, such as web page 300, into a device 104a or 104b. For illustrative purposes, the available connections are displayed as web page 300. Portable gateway 103 allows a user to select a connection from the displayed available connection. After the user has selected a connection, portable gateway 103 may configure a WAN interface, such as WAN interface 109, for the selected connection. Further, portable gateway 103 may connect to a wireless gateway, such as wireless gateway 102a, through the selected connection by using WAN interface 109.

In step 201, portable gateway 103 searches for the available connections, when portable gateway 103 is not able to have access to internet 101. The available connections are the connections which are reachable to portable gateway 103.

In step 202, the available connections are displayed through web page 300 to the user of device 104a or 104b. A detailed description of web page 300 of FIG. 3 will be described later herein.

In step 203, portable gateway 103 allows the user of device 104a or 104b through web page 300 to select a connection from the available connections.

Figure 3:
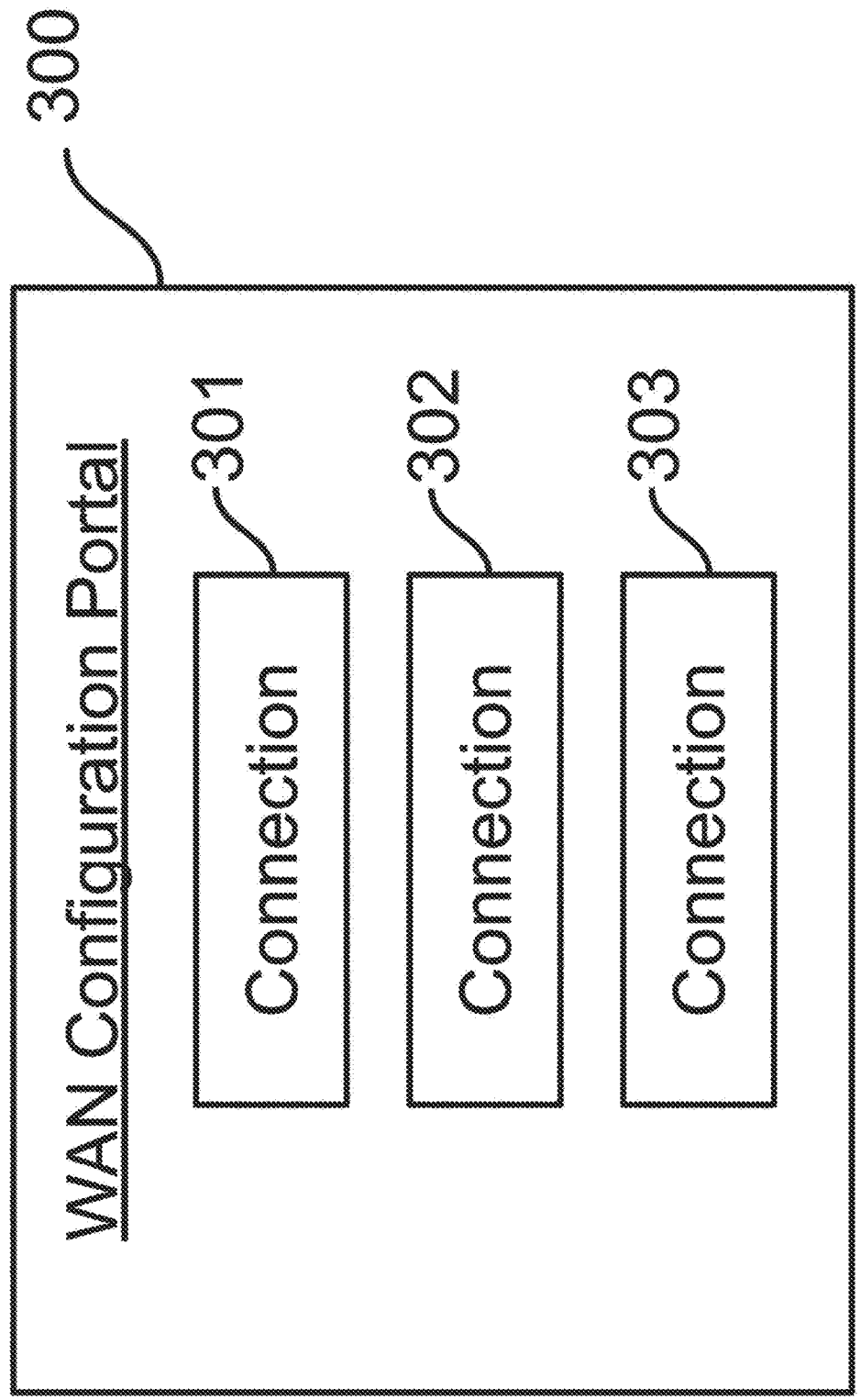
FIG. 3 illustrates an embodiment of portable gateway 103 of the present invention.

In step 204, the user of device 104a or 104b selects a connection through web page 300 of FIG. 3, from the available connections. In one variant, portable gateway 103 selects a connection without displaying and allowing the user of device 104a or 104b in steps 202-203, when only one connection is available.

In another variant, portable gateway 103 selects a connection without performing steps 202-203. In this variant, information associated with the connection is retrieved by portable gateway 103. The information comprises network name, such as service set identifier (SSID) and/or password for the connection. The information is stored in a storage medium at portable gateway 103, devices 104a, 104b, or any other external or remote storage connected to portable gateway 103. A connection selection criteria is used to select the connection. In another variant, the information comprises network names and/or passwords for more than one connections from the available connections. Portable gateway 103 selects a connection through the connection selection criteria by using the information according to a predefined scheme.

In step 205, portable gateway 103 configures WAN interface 109 for the selected connection. WAN interface 109 is configured with an IP address leased by wireless gateway 102a.

In step 206, portable gateway 103 connects to wireless gateway 102a through the selected connection by using WAN interface 109. Portable gateway 103 further starts sending and receiving IP data packets using selected connection through WAN interface 109 via wireless gateway 102a.

It should be noted that, a person having ordinary skill in the art would appreciate that step 205 may be performed after step 201 without performing steps 202-204 when the information associated with the available connections is stored, and then retrieved by portable gateway 103. A detailed description is described later according to FIG. 2B.

Figure 2B:
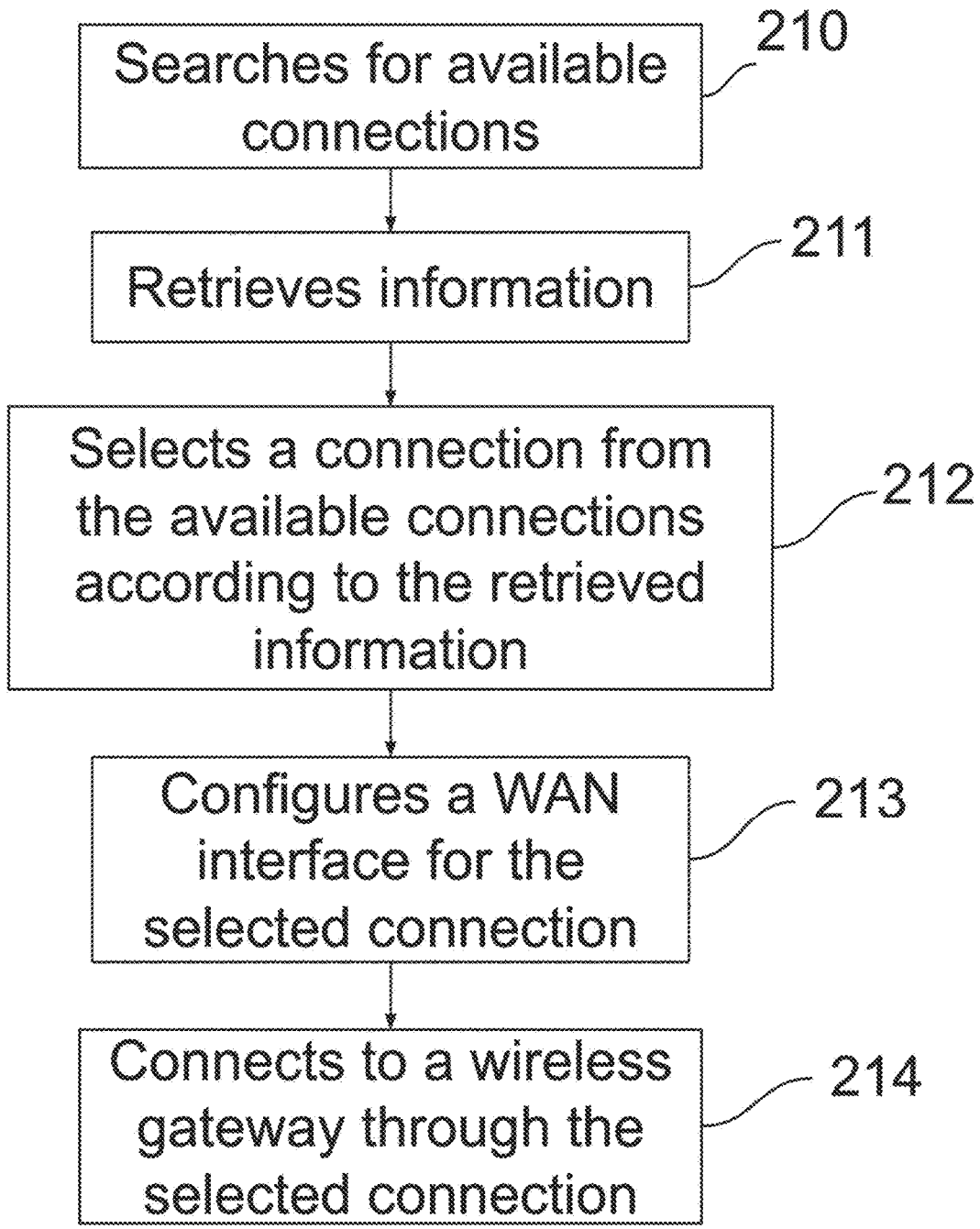
FIG. 2B is a flowchart illustrating a process according to one of the embodiments of the present invention.

FIG. 2B is a flowchart illustrating a process according to one of the embodiments of the present invention. FIG. 2B is viewed in conjunction with FIG. 1A and FIG. 2A for better understanding of the embodiments.

In an exemplary network, there is a plurality of wireless connections and wired connections. Portable gateway 103 is used to have a connection selection criteria for selecting a connection, such as connection 106, from the plurality of connections. Information comprising SSID and/or password is used for configuring a WAN interface, such as WAN interface 109, of portable gateway 103 to establish connection 106. Portable gateway 103 retrieves the information for connecting to a wireless gateway, such as wireless gateway 102a, through connection 106. The information used for establishing connection 106 is stored by portable gateway 103 in a storage medium of portable gateway 103, device 104a or 104b, or external or remote storage medium connected to portable gateway 103.

In step 210, portable gateway 103 searches for the available connections.

In step 211, portable gateway 103 retrieves information from the storage medium, and is comprised of SSID and/or password. The connection selection criteria is used for selecting a connection from the available connections according to the SSID and/or password. The SSID and/or password is stored at the storage medium of portable gateway 103, device 104a or 104b. Alternatively, the SSID and/or password are retrieved from a remote storage connected to portable gateway 103.

In step 212, portable gateway 103 selects a connection from the available connections, according to the retrieved SSID and/or password in step 211. Portable gateway 103 matches the SSID and/or password if the SSID and/or password is associated with any connection from the available connections. If the SSID and/or password matches with a connection from the available connections, then the connection selection criteria gets satisfied to select the connection It is possible that no connection is selected if none of the available connections satisfy the connection selection criteria and the user of device 104a or 104b is allowed to select a connection according to FIG. 2A.

In one variant, information comprising SSIDs and/or passwords of more than one connection of the available connections is stored by portable gateway 103. In this variant, a predefined scheme is set at portable gateway 103 by the user of device 104a or 104b to select a connection from more than one available connection. The predefined scheme is based on various factors. For example, wireless frequency, radio signal strength, geographical location etc. In case of wireless frequency, portable gateway 103 selects one of the available connections which is between a particular range of wireless spectrum. In case of radio signal strength, portable gateway 103 selects one of the available connections which has better strength and stability. In case of geographical location, portable gateway 103 selects one of the available connections based on the location of portable gateway 103.

In step 213, portable gateway 103 configures WAN interface 109 for the selected connection 106.

In step 214, portable gateway 103 connects to wireless gateway 102a through the selected connection 106 by using WAN interface 109. Portable gateway 103 further starts sending and receiving IP data packets using the selected connection through WAN interface 109 via wireless gateway 102a.

FIG. 3 illustrates an embodiment of portable gateway 103 of the present invention. FIG. 3 is viewed in conjunction with FIG. 1A for better understanding of the embodiments. FIG. 3 may be a web page 300 generated and stored by portable gateway 103.

Web page 300 allows users to configure a WAN interface, such as WAN interface 109, of portable gateway 103. Portable gateway 103 is configured to forward web page 300 to any of the devices, such as device 104a or 104b.

Web page 300, titled with "WAN Configuration Portal", may be a designed website which brings accessibility from portable gateway 103 to any of the devices 104a and 104b through connections 107 and 108 respectively. The user of device 104a or 104b is then able to access web page 300 through any web browser, such as Firefox, Chrome etc.

Connections 301, 302 and 303 are displayed as three input fields contained in web page 300. Connections 301, 302 and 303 are the available connections, such as the available connections searched in step 201 of FIG. 2A. There is no limitation that there are only three available connections to be searched. For example, connections 301, 302 and 303 are reachable to portable gateway 103. Connections 301, 302 and 303 are then available connections to portable gateway 103.

The user of device 104a or 104b is allowed by portable gateway 103 to select a connection among the available connections.

The user of device 104a or 104b then selects a connection among the available connections. For example, the user of device 104a or 104b then selects connection 301.

In one variant, the user of device 104a or 104b selects more than one connection among the available connections. A detailed description is described later according to FIGS. 1B and 1C.

Portable gateway 103 connects to wireless gateway 102a through the selected connection.

Figure 4:
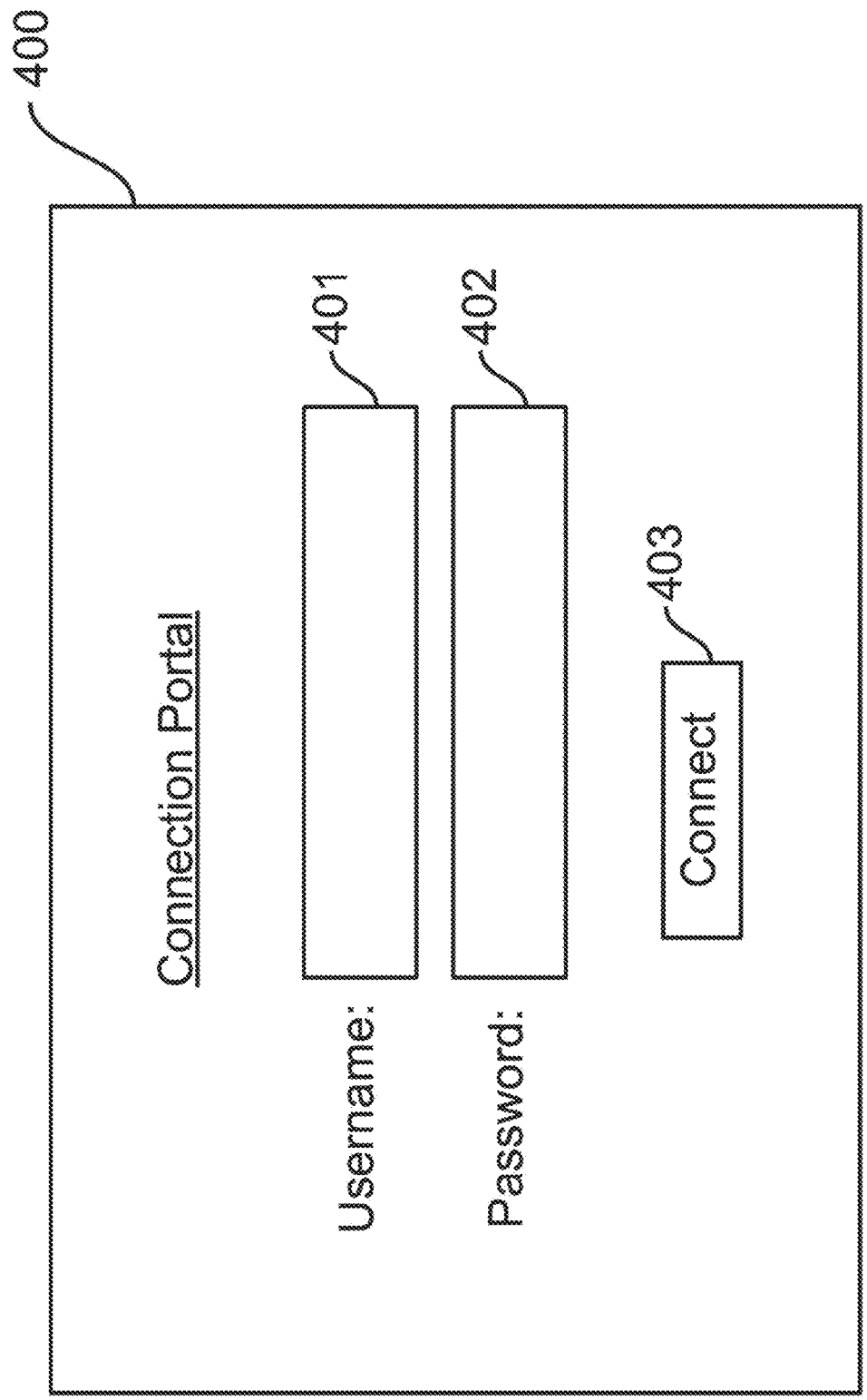
FIG. 4 illustrates an embodiment of the present invention.

FIG. 4 illustrates an embodiment of the present invention. FIG. 4 is viewed in conjunction with FIG. 1A for better understanding of the embodiments. FIG. 4 may be a web page 400 created by and stored in a wireless gateway, such as wireless gateway 102a. Web page 400 is redirected to portable gateway 103 through connection 106.

The web page 400 is displayed into a web page, such as web page 300, of FIG. 300. Web page 400 is an exemplary web page which is not obligatory in the present invention, and based on a wireless gateway, such as wireless 102a.

Portable gateway 103 sends an IP data packet to a wireless gateway 102a through connection 106 when portable gateway 103 is connecting to gateway 102a. Portable gateway 103 receives responding IP data packets comprising web page 400. Portable gateway 103 then forwards web page 400 to device 104a or 104b through connections 107 or 108.

Web page 400 is referred to as 'Connection Portal' herein for illustration purpose. Web page 400 is displayed and accessed through web page 300 of FIG. 3.

Web page 400 contains three fields, namely Username 401, Password 402 and Connect 403. Web page 400 may be any type of web page containing any field and not limited to Username 401, Password 402 or Connect 403. Web page 400 may be redirected by wireless gateway 102a to device 104a or 104b through web page 300.

The user of device 104a or 104b has information for the fields of web page 400. The information is obtained from the administrator of wireless gateway 102a. The user of device 104a or 104b then provides the information into web page 400. Portable gateway 103 then establishes a connection, such as connection 106, and gets access to internet 101 through wireless gateway 102a. For example, the information for Username 401 may be 'admin' and the information for Password 402 may be 'password' that may be obtained from administrator of wireless gateway 102a in FIG. 1A. The user of device 104a or 104b then inputs the information in the fields of Username 401 and Password 402 through web page 400 in FIG. 4. Further, the user of device 104a or 104b then selects Connect 403 for connecting to wireless gateway 102a through connection 106 to get access to Internet 101. Portable gateway 103 then configures a WAN interface, such as WAN interface 109, and establishes connection 106. Portable gateway 103 then gets access to internet 101 through wireless gateway 102a.

Figure 5:
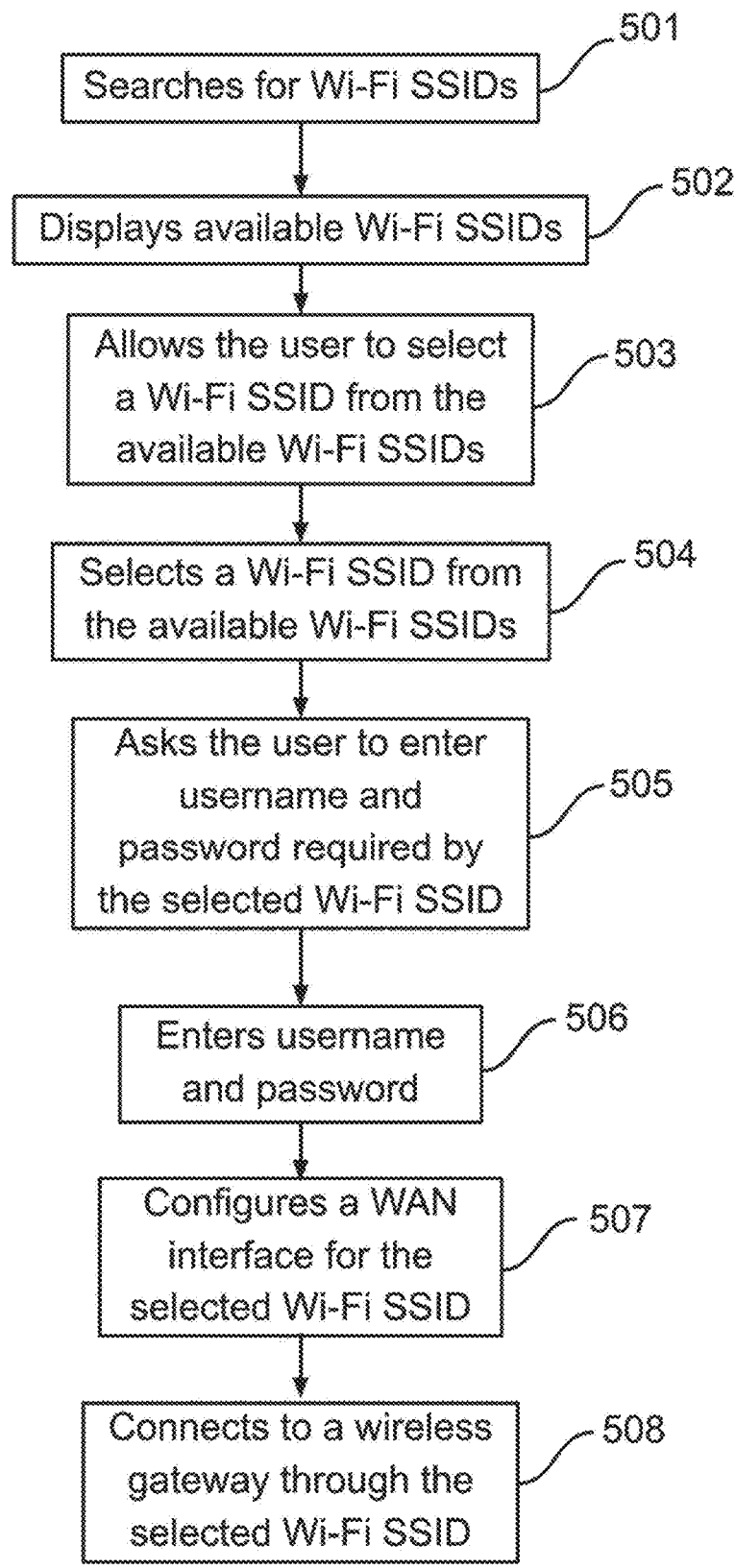
FIG. 5 is a flowchart illustrating a process according to one of the embodiments of the present invention.

FIG. 5 is a flowchart illustrating a process according to one of the embodiments of the present invention. FIG. 5 is a detailed illustration when portable gateway 103 is used to connect to a wireless connection, such as connection 106. FIG. 5 is viewed in conjunction with FIG. 1A for better understanding of the embodiments.

In a networking environment, there may be a plurality of wireless connections, such as connection 106. Portable gateway 103 is configured to search for available wireless connections, such as Wi-Fi SSIDs, from the plurality of wireless connections. Portable gateway 103 allows a user to select a wireless connection from the available wireless connections through a web page, such as web page 300. Web page 300 may be viewed at a device, such as device 104a or 104b. The user will select a wireless connection. Portable gateway 103 allows the user to enter a username and a password of the selected wireless connection through another web page, such as web page 400. Web page 400 may be redirected from a wireless gateway, such as wireless gateway 102a, and may be viewed into web page 300 at device 104a or 104b. The user will enter the username and password for the selected wireless connection. Portable gateway 103 will configure a WAN interface, such as WAN interface 109. Portable gateway 109 will then connect to wireless gateway 102a, through the selected wireless connection by WAN interface 109.

In step 501, portable gateway 103 searches for the available Wi-Fi SSIDs when there is no connection connected to get access to internet 101. Here, the available Wi-Fi SSIDs are the available wireless connections which are reachable to portable gateway 103.

In step 502, the available Wi-Fi SSIDs are displayed to the user of device 104a or 104b, through web page 300.

In step 503, portable gateway 103 allows the user of device 104a or 104b to select a Wi-Fi SSID from the available Wi-Fi SSIDs, through web page 300.

In step 504, the user of device 104a or 104b selects a Wi-Fi SSID from the available Wi-Fi SSIDs, through web page 300. In one variant, portable gateway 103 selects a Wi-Fi SSID without displaying and allowing the user of device 104a or 104b in steps 502-503, when only one Wi-Fi SSID is available.

In another variant, portable gateway 103 selects a Wi-Fi SSID from the available Wi-Fi SSIDs without performing steps 502-503. In this variant, information associated with the Wi-Fi SSID is retrieved by portable gateway 103. The information comprises the network name of the Wi-Fi SSID, and is stored in a storage medium of portable gateway 103, device 104a or 104b, or external or remote storage medium connected to portable gateway 103. A connection selection criteria is used to select the wireless connection. Here, the connection selection criteria is used in the same manner used for FIG. 2B.

In another variant, portable gateway 103 stores information which is associated with more than one available Wi-Fi SSIDs. In another variant, the information comprises network names for more than one wireless connection from the available wireless connections. Portable gateway 103 selects a wireless connection through the connection selection criteria by using the information according to a predefined scheme. Here, the predefined scheme is applicable in the same manner described for FIG. 2B.

It should be noted that, a person having ordinary skill in the art would appreciate that, step 504 may be performed directly after step 501 without performing steps 502-503, when information associated with the available Wi-Fi SSIDs is stored, and then retrieved by portable gateway 103.

In step 505, portable gateway 103 asks the user of device 104a or 104b to enter a username and a password required for the selected Wi-Fi SSID, through web page 400 Web page 400 is viewed into web page 300

In step 506, the username and the password are required to be entered by the user of device 104a or 104b, through web page 400. The username and password may be obtained from administrator of wireless gateway 102a. For example, the username may be "admin" and the password may be "password". The user of device 104a or 104b may then enter "admin" for the username and "password" for the password.

In one variant, portable gateway 103 enters username and password without asking the user of device 104a or 104b. In this variant, the username and the password are retrieved from the storage medium of portable gateway 103, device 104a or 104b, or external or remote storage medium connected to portable gateway 103. Portable gateway 103 matches the username and the password if the username and the password match respectively with the username and password required by the selected Wi-Fi SSID. For example, "admin" for the username and "password" for the password are required for the selected Wi-FI SSID. Portable gateway 103 is able to retrieve "admin" as the username and "password" as the password for the selected Wi-Fi SSID. Portable gateway 103 then enters "admin" for username and "password" for the selected Wi-Fi SSID.

In step 507, portable gateway 103 configures a WAN interface, such as WAN interface 109, for the selected Wi-Fi SSID.

It should be noted that, a person having ordinary skill in the art would appreciate that, step 507 may be performed directly after step 504 without performing steps 505-506 when the username and the password required for the selected Wi-Fi SSID is retrieved by portable gateway 103. Alternatively, there are mynad ways to connect to a Wi-Fi SSID other than entering the username and the password.

In one variant, there may be no need for the username and the password for connecting to a Wi-FI SSID, such as an open Wi-Fi SSID, after selecting the open WI-FI SSID. The open Wi-FI SSID is preset without any security by the administrator of wireless gateway 102a and may not require any username and password for connecting. Portable gateway 103 may then connect to wireless gateway 102a through the open Wi-Fi SSID without entering any username and password.

In step 508, portable gateway 103 connects to a wireless gateway, such as wireless gateway 102a, through the selected Wi-Fi SSID by using WAN interface 109. Portable gateway 103 further starts sending and receiving IP data packets using the selected Wi-Fi SSID through WAN interface 109 via wireless gateway 102a.

Figure 6:
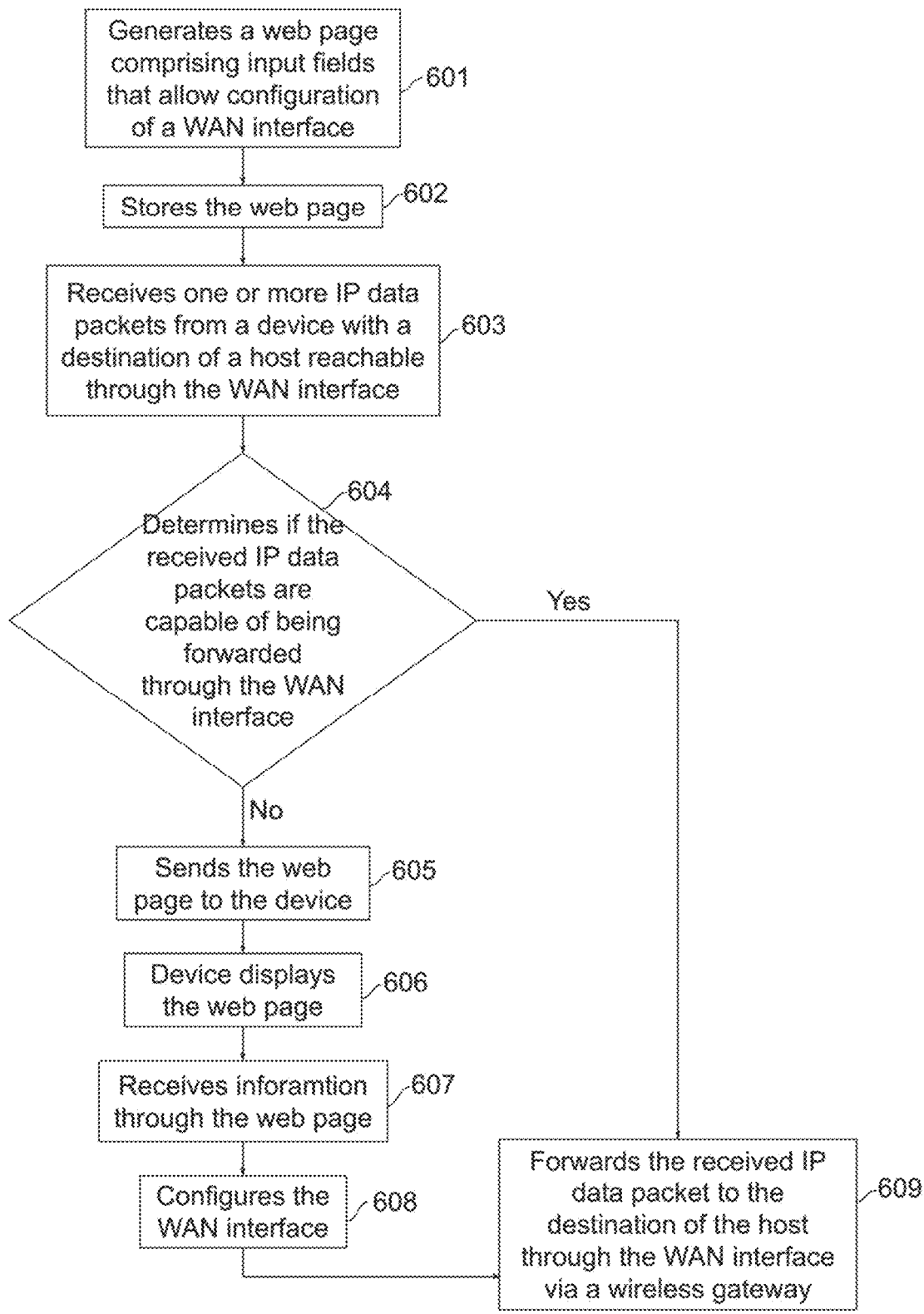
FIG. 6 is a flowchart illustrating a process according to one of the embodiments of the present invention.

FIG. 6 is a flowchart illustrating a process according to one of the embodiments of the present invention. FIG. 6 is viewed in conjunction with FIG. 1A for better understanding of the embodiments.

FIG. 6 describes how a web page, such as web page 300 of FIG. 3, will be forwarded by portable gateway 103 to a device, such as device 104a or 104b.

Apart from web page 300, portable gateway 103 is also able to create or generate web page 700, web page 1000, or web page 1100 for further configuration of one or more WAN interfaces. The web page is further forwarded to device 104a or 104b. Web page 700 of FIG. 7B, web page 1000 of FIG. 10, and web page 1100 of FIG. 11 are described later herein.

Figure 1B:
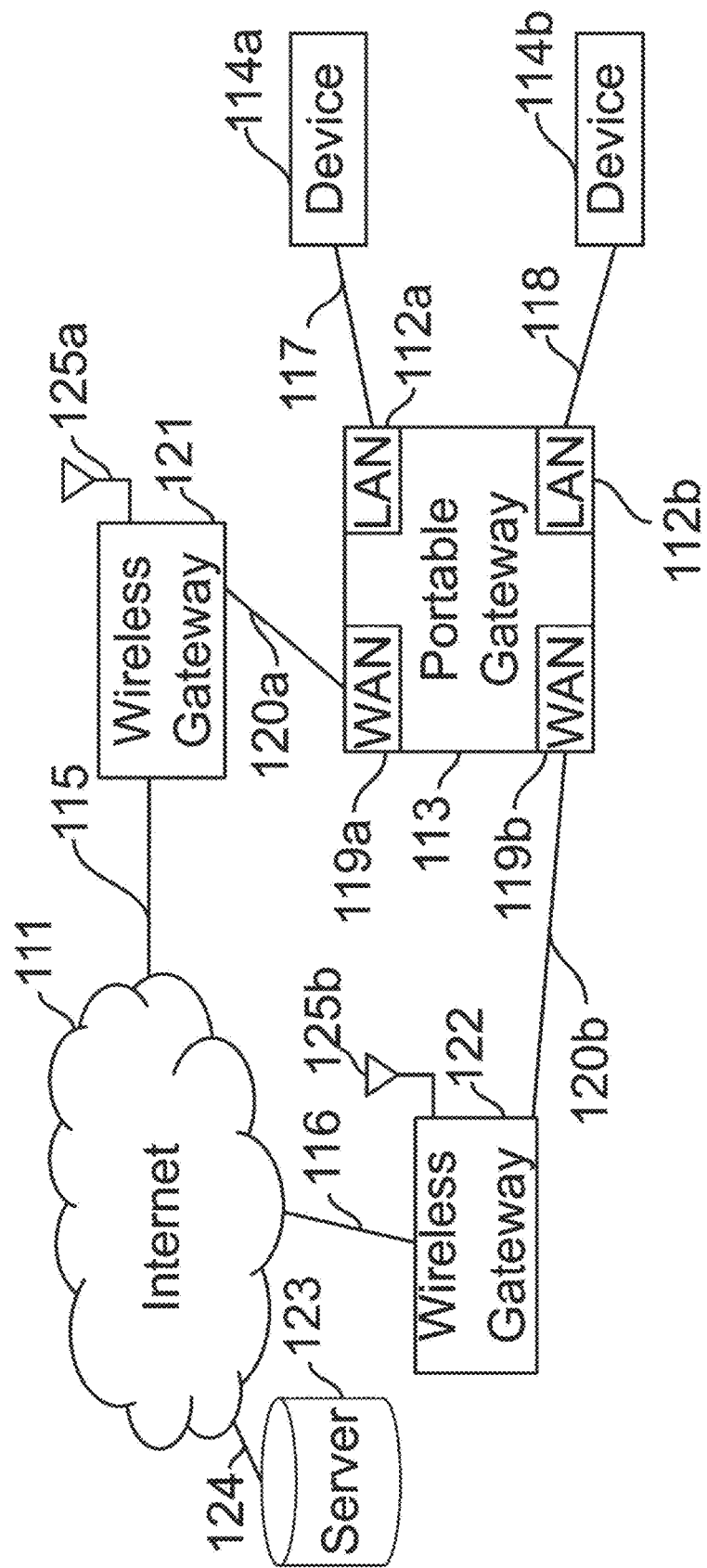
FIG. 1B illustrates a network environment according to various embodiments of the present invention.
Figure 1C:
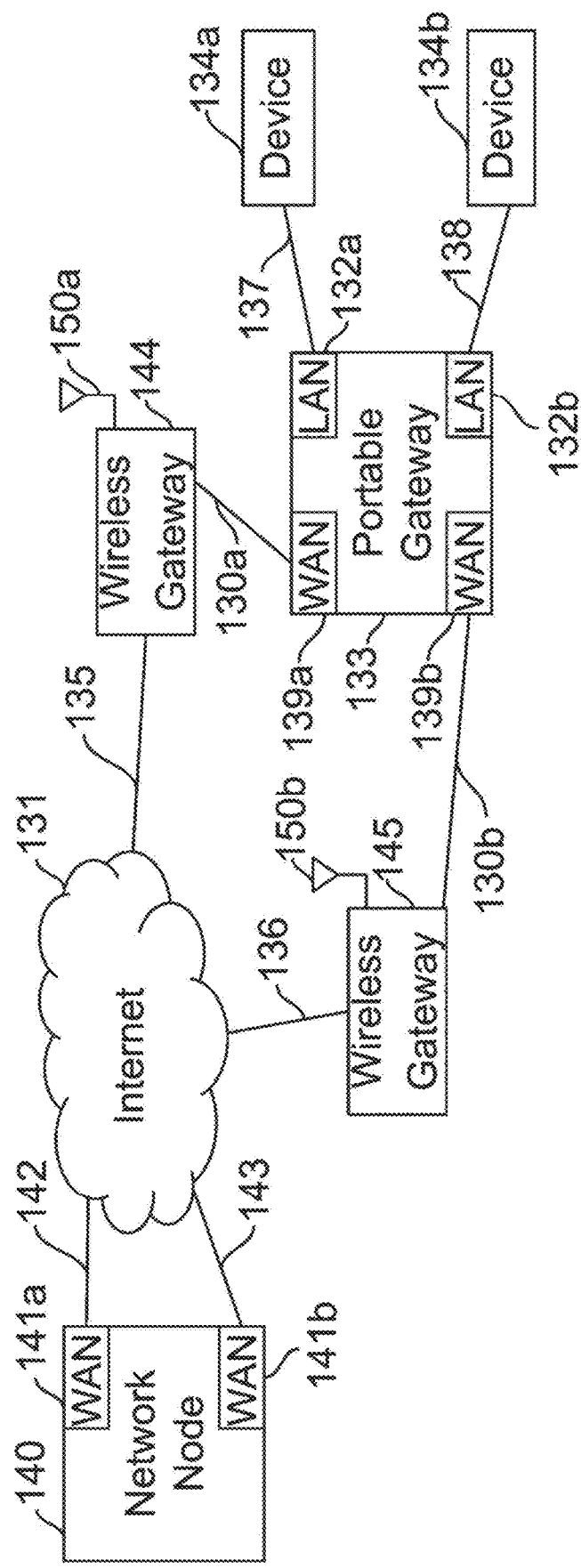
FIG. 1C illustrates a network environment according to various embodiments of the present invention.
Figure 11:
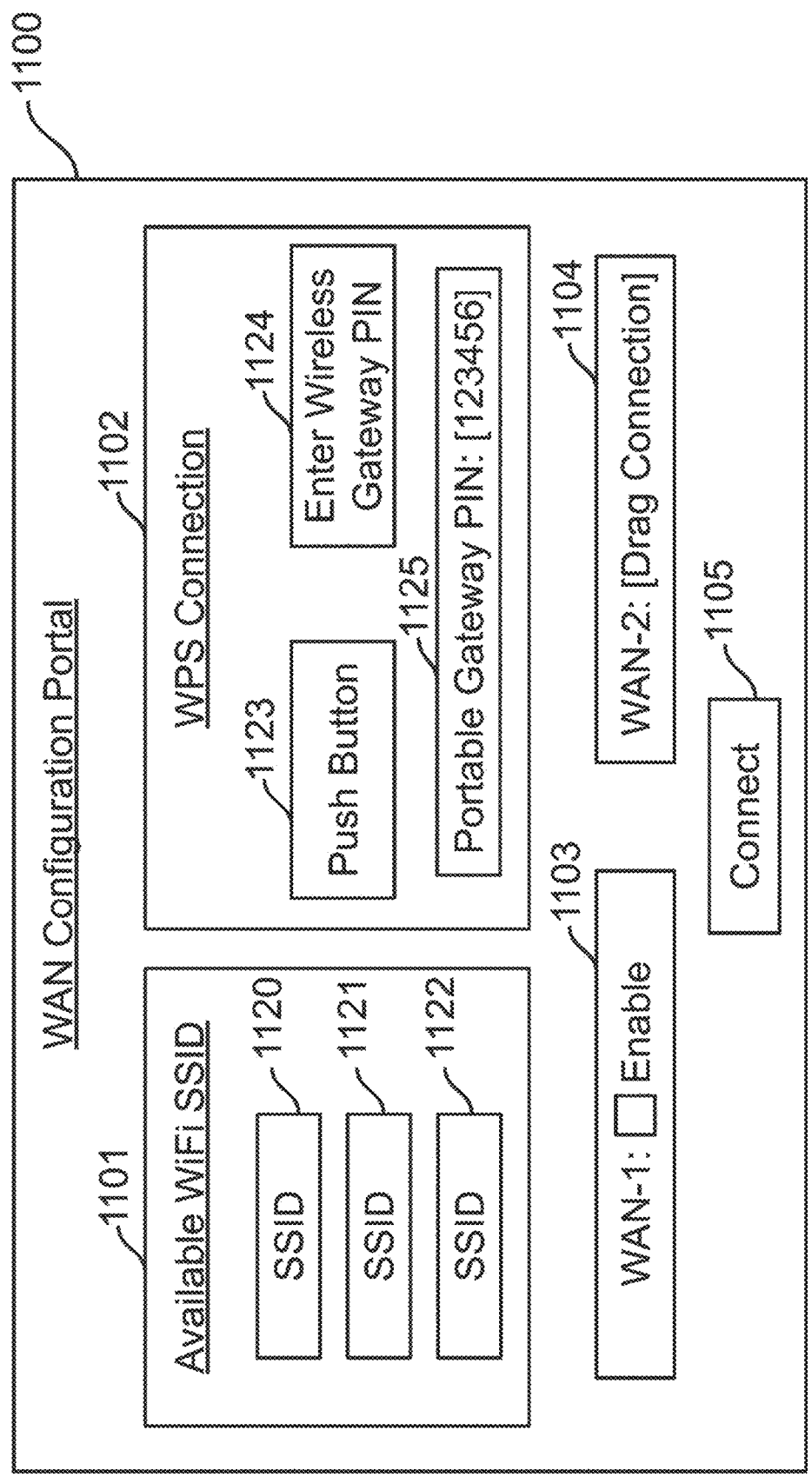
FIG. 11 illustrates an embodiment of portable gateways 113 and 213 in FIGS. 1B and 1C respectively of the present invention.

A portable gateway, such as portable gateway 113 of FIG. 1B or portable gateway 133 of FIG. 1C, is configured to generate web page 1100 of FIG. 11 comprising input fields that allow configuration of a plurality of WAN interfaces.

Web page 1100 of FIG. 11 is described later herein. Any of the portable gateways 103, 113 and 133 is configured to process how a web page will be forwarded to a device according to FIG. 6. For example, web page 300 is determined herein to describe the process of FIG. 6, at portable gateway 103.

Portable gateway 103 will receive one or more IP data packets from a device through a LAN interface, such as LAN interface 112a or 112b of portable gateway 103 in FIG. 1A. Portable gateway 103 cannot forward the IP data packets through WAN interface, such WAN interface 109 of portable gateway 103 in FIG. 1A. Portable gateway 103 will then create responding IP data packets comprising web page 300 and forward the responding IP packet to the device.

In step 601, portable gateway 103 generates web page 300 comprising input fields that allow configuration of a WAN interface, such as WAN interface 109. Web page 300 may be a computer file written in HyperText Markup Language (HTML), extensible HyperText Markup Language (XHTML) or a comparable markup language.

In step 602, portable gateway 103 stores web page 300. Portable gateway 103 hosts the computer file by storing web page 300.

In step 603, portable gateway 103 receives one or more IP data packets from any of the devices 104a and 104b with a destination of a host reachable to WAN interface 109. For example, portable gateway 103 receives the IP data packets from device 104a.

In step 604, portable gateway 103 determines if the received IP data packets are capable of being forwarded through the WAN interface 109. For example, portable gateway 103 has no access to internet 101. Portable gateway 103 is then not capable to forward the received IP data packet. On the other hand, portable gateway 103 has access to internet 101. Portable gateway 103 is then capable to forward the received IP data packet through the WAN interface 109. Portable gateway 103 then follows step 609 to forward the received IP data packet.

In step 605, portable gateway 103 sends web page 300 to device 104a, when portable gateway 103 determines that the received IP data is not capable of being forwarded.

In one variant, portable gateway 103 identifies one of the devices 104a and 104b from which the IP data packets are received in step 603 Further, portable gateway 103 sends the responding IP data packets to the identified device 104a or 104b in step 606. A detailed description is described later according to FIG. 8.

In step 606, device 104a displays web page 300 upon receiving the responding IP data packets from portable gateway 103.

In step 607, portable gateway 103 receives information through web page 300. The information is to configure WAN interface 109. A connection, such as connection 106, is then established.

In step 608, portable gateway 103 configures WAN interface 109. WAN interface 109 is configured in view of the process described according to FIG. 2A, FIG. 2B, FIG. 5 or FIG. 7A.

In step 609, portable gateway 103 forwards the received IP data packets to the destination of the host through WAN interface 109 via wireless gateway 102a. The received IP data packets are forwarded through connection 106. Portable gateway 103 then starts sending and receiving further IP data packets to the destination of the host through WAN interface 109 via wireless gateway 102a.

Portable gateway 103 performs step 609 after step 608 when portable gateway 103 determines if the received IP data is not capable of being forwarded through the WAN interface 109.

Portable gateway 103 performs step 609 after step 604 when portable gateway 103 determines if the received IP data is capable of being forwarded through the WAN interface 109.

Figure 7A:
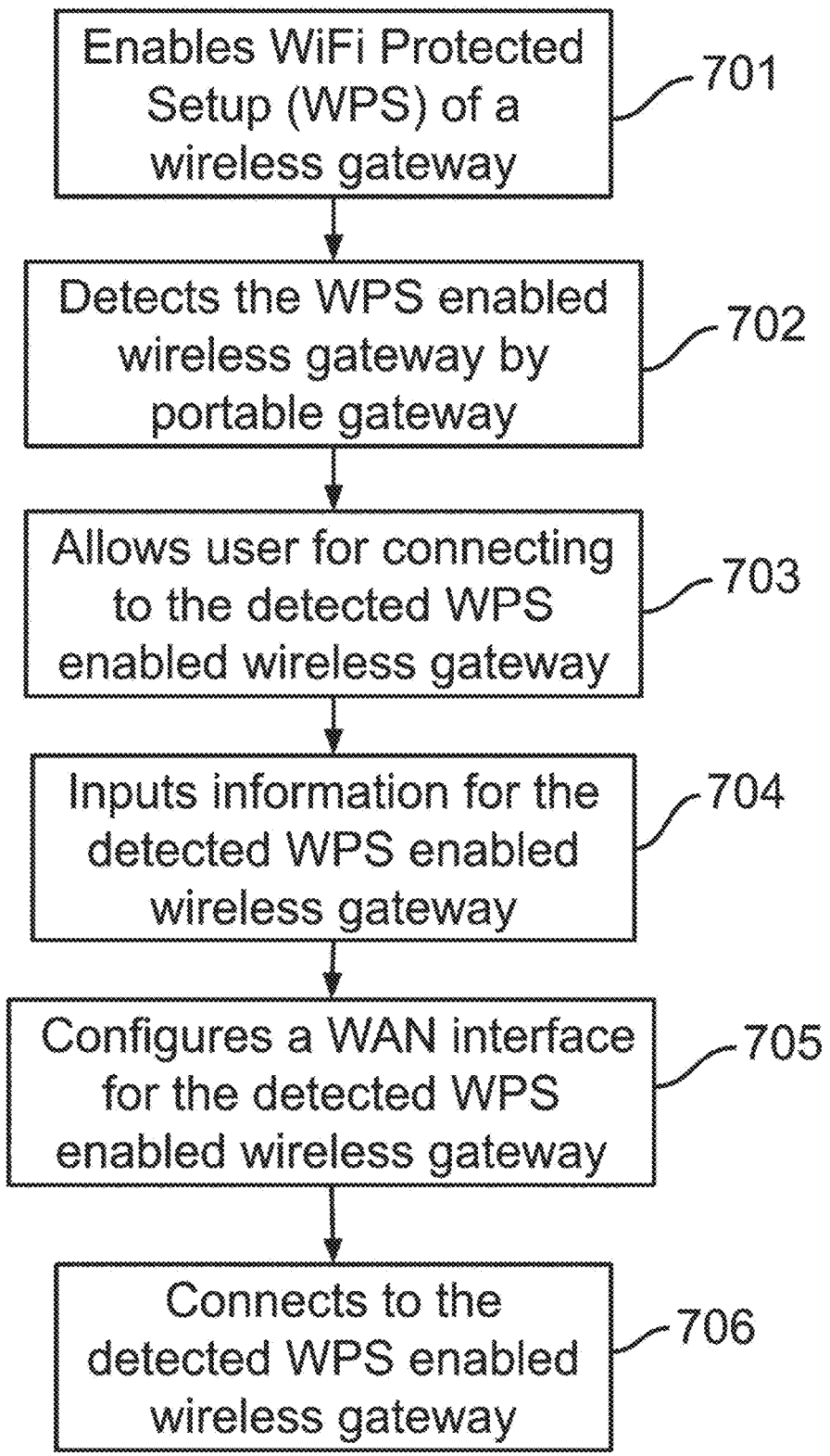
FIG. 7A is a flowchart illustrating a process according to one of the embodiments of the present invention.

FIG. 7A is a flowchart illustrating a process according to one of the embodiments of the present invention. FIG. 7A may be viewed in conjunction with FIG. 1A for better understanding of the embodiments.

Portable gateway 103 is configured to detect a Wi-Fi Protected Setup (WPS) enabled wireless gateway, such as wireless gateway 102a or 102b of FIG. 1A. It is known in the art, when a wireless gateway is capable to provide a connection through IEEE 802.11, the wireless gateway provides the connection through WPS technology. Portable gateway 103 then connects to any of the wireless gateways 102a and 102b through WPS technology.

In step 701, a wireless gateway, such as wireless gateway 102a, enables its WPS function. An administrator of wireless gateway 102a may enable the WPS function by pressing a Push Button of wireless gateway 102a. It should be noted that a person having ordinary skill in the art would appreciate that, the Push Button may be a physical button coupled to wireless gateway 102a or a virtual button associated with wireless gateway 102a.

In one variant, the WPS function of a wireless gateway may be enabled by swapping an NFC token to the NFC supported access point, which is connected to wireless gateway 102a. The NFC token may be a mobile device herein.

In step 702, portable gateway 103 detects WPS-enabled devices, such as wireless gateway 102a. Step 702 may be implemented by using any tool, such as *Kali* Linux Wash tool, by portable gateway 103.

Figure 7B:
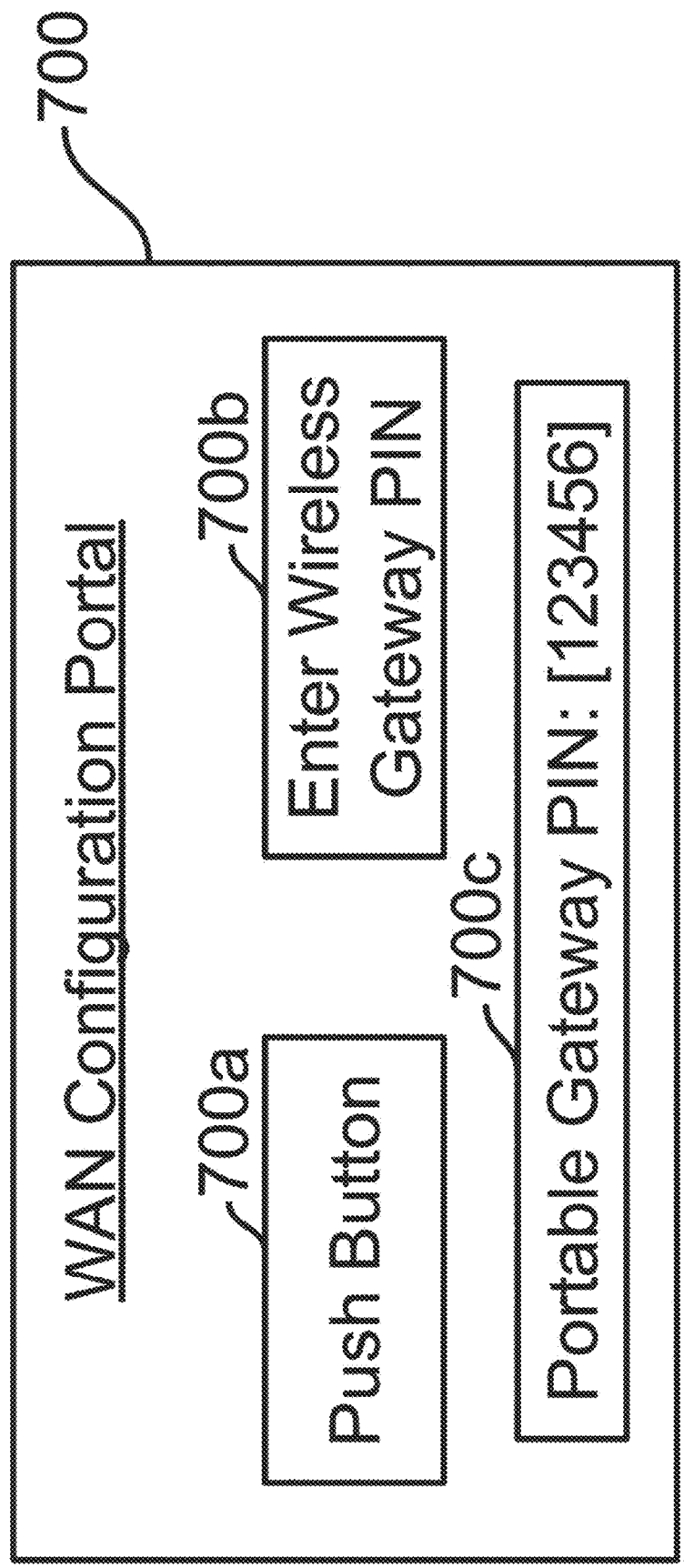
FIG. 7B illustrates an embodiment of portable gateway 103 of the present invention.

In step 703, portable gateway 103 allows the user of device 104a or 104b for connecting to the detected WPS-enabled wireless gateway 102a through WPS technology by using a web page, such as web page 700 of FIG. 7B. A detailed description of web page 700 will be described later herein.

In step 704, the user of device 104a or 104b is required to input information for the detected WPS-enabled wireless gateway 102a through web page 700. The information for the detected WPS-enabled wireless gateway 102a is based on Push Button of wireless gateway 102a, PIN of wireless gateway 102a or PIN of portable gateway 103.

In step 705, portable gateway 103 configures a WAN interface, such as WAN interface 109 for establishing a wireless connection with the detected WPS-enabled wireless gateway 102a.

It should be noted that a person having ordinary skill in the art would appreciate that, by entering the PIN of wireless gateway 102a into portable gateway 103 or by entering the PIN of portable gateway 103 into wireless gateway 102a can be an alternative method for establishing a wireless connection between portable gateway 103 and wireless gateway 102a. Portable gateway 103 then configures WAN interface 109.

In step 706, portable gateway 103 connects to the detected WPS-enabled wireless gateway 102a using the wireless connection through WPS technology. Portable gateway 103 further starts sending and receiving IP data packets using the wireless connection through WAN interface 109 via wireless gateway 102a.

FIG. 7B illustrates an embodiment of portable gateway 103 of FIG. 1A in the present invention. FIG. 7B is viewed in conjunction with FIGS. 1A and 7A for better understanding of the embodiments. FIG. 7B may be a web page 700 generated and stored by portable gateway 103.

Web page 700 comprises functionalities, such as push button, entering gateway PIN, showing portable gateway PIN etc. for connecting through WPS technology to a wireless gateway, such as wireless gateway 102a through a wireless connection, such as connection 106 1A of FIG. 1A. These functionalities are allowed to configure a WAN interface, such as WAN interface 109 of portable gateway 103. Portable gateway 103 is configured to forward web page 700 to any of the devices, such as device 104a or 104b.

Web page 700, titled with "WAN Configuration Portal", may be a designed website which brings accessibility from portable gateway 103 to any of the devices 104a and 104b through connections 107 and 108 respectively The user of device 104a or 104b is then able to access web page 700 through any web browser, such as Firefox, Chrome etc.

Web page 700 contains three fields, namely Push Button 700a, Enter Wireless Gateway PIN 700b and Portable Gateway PIN 700c. When portable gateway 103 allows the user to select one of the three fields, the user of device 104a or 104b is required to select one of the three fields. Portable gateway 103 is then connected to wireless gateway 102a through a Wi-Fi SSID of wireless gateway 102a. The Wi-FI SSID is a wireless connection, such as connection 106. Selection of a field from the three fields may be based on administrator of wireless gateway 102a, as administrator of wireless gateway 102a is allowed to use any of the functionalities in regard to the three fields.

In one variant, the user of device 104a or 104b is required to select Push Button 700a. In this variant, administrator of wireless gateway 102a enables Push Button mode in wireless gateway 102a for WPS technology.

In another variant, the user of device 104a or 104b is required to select Enter Wireless Gateway PIN 700b. In this variant, administrator of wireless gateway 102a provides a PIN of wireless gateway 102a to the user of device 104a or 104b. The user of device 104a or 104b then inputs the PIN of wireless gateway 102a in Enter Wireless Gateway PIN 700b.

In another variant, the user of device 104a or 104b is required to select Portable Gateway PIN 700c. In this variant, the user of device 104a or 104b has a PIN of portable gateway 103. The user of device 104a or 104b may then be able to provide PIN of portable gateway 103 to administrator of wireless gateway 102a. For example, the PIN of portable gateway 103 is '123456'. The user of device 104a or 104b is required to provide PIN, '123456' to administrator of wireless gateway 102a.

Figure 10:
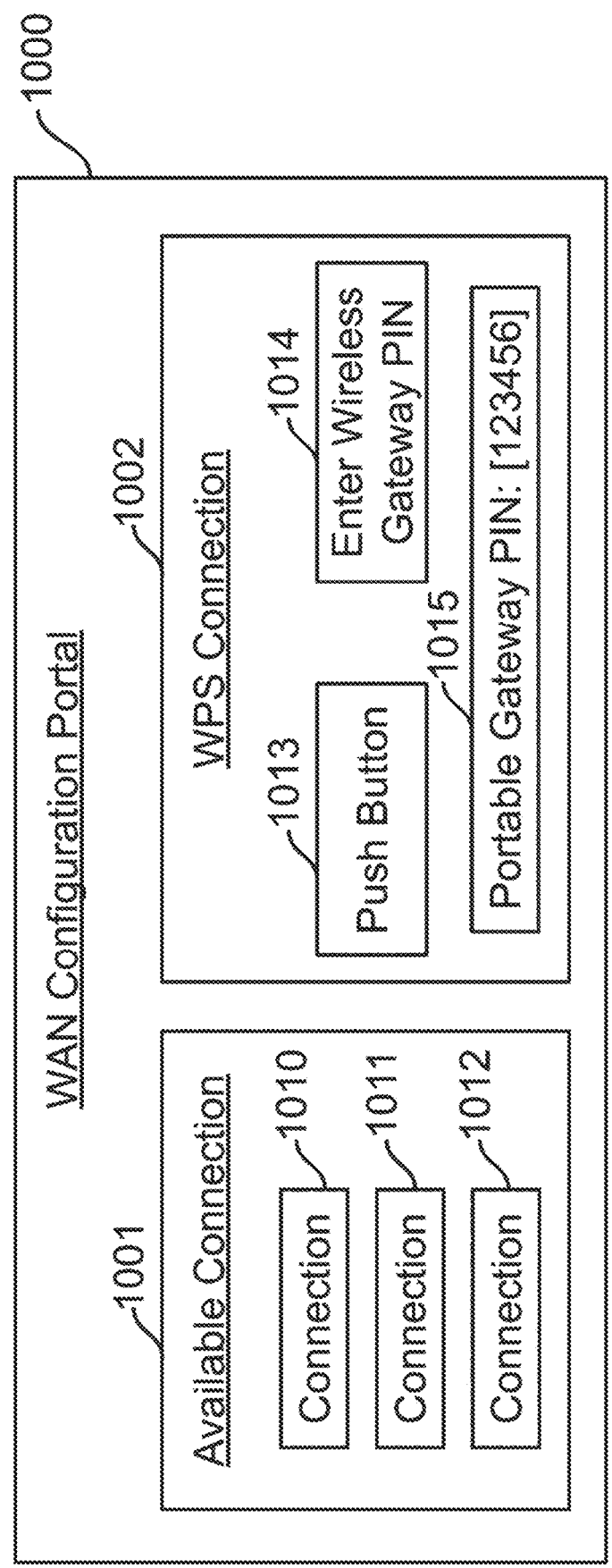
FIG. 10 illustrates an embodiment of portable gateway 103 in FIG. 1A of the present invention.

It should be noted that, a person having ordinary skill in the art would appreciate that, portable gateway 103 generates a web page, such as web page 1000 of FIG. 10, combining both web page 300 and web page 700. Web page 1000 contains fields of web page 300 and fields of web page 700. A detailed description of FIG. 10 is described later.

Figure 8:
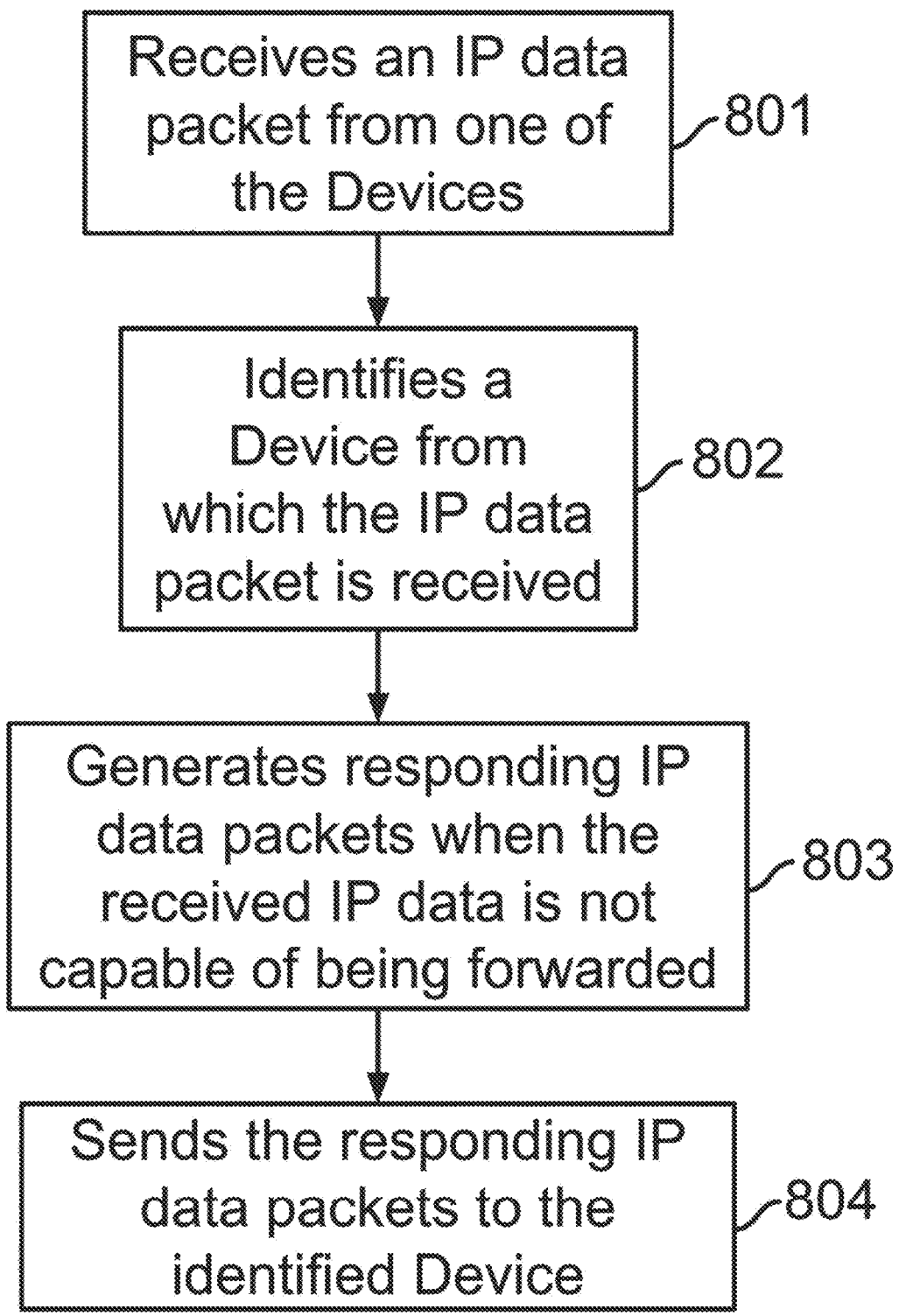
FIG. 8 is a flowchart illustrating a detailed description of steps 603-606 in FIG. 6.

FIG. 8 is a flowchart illustrating a detailed description of steps 603-606 in FIG. 6 when there is more than one device, such as device 104a or 104b.

In a networking environment, there is a plurality of devices, such as devices 104a and 104b, connected to portable gateway 103 in FIG. 1A, devices 104a and 104b are connected through any of the LAN interfaces, such as 110a and 110b of portable gateway 103. Portable gateway 103 is allowed to receive one or more IP data packets from any of the plurality of devices. Portable gateway 103 has no access to the internet and cannot forward the received IP packet through a WAN interface, such as WAN interface 109 of portable gateway 103 in FIG. 1A. Portable gateway 103 is configured to create responding IP data packets comprising a web page, in response to the received IP packet. Portable gateway 103 identifies the devices, such as device 104a or 104b, by which the IP packet is received. Portable gateway 103 will then forward the responding IP packets to the identified devices.

In step 801, portable gateway 103 receives one or more IP data packets from one of the devices 104a and 104b. Each of the IP data packets consists of header and payload. The header provides data for delivering the payload. For example, source and destination addresses, error detection codes, and sequencing information.

In step 802, portable gateway 103 identifies one of devices 104a and 104b from the source address of the received IP data packet. For example, portable gateway 103 identifies device 104a from the source address of received IP data packets when the IP data packets are received from device 104a.

In step 803, portable gateway 103 generates responding IP data packets when the received IP data is not capable of being forwarded. The responding IP data packets comprise web page 300 of FIG. 3, web page 700 of FIG. 7B, or web page 1000 of FIG. 10.

In step 804, portable gateway 103 sends the responding IP data packets to the identified devices 104a.

It should be noted that, a person having ordinary skill in the art would appreciate that, steps 802-804 may be performed by using Network Address Translation (NAT).

Figure 9:
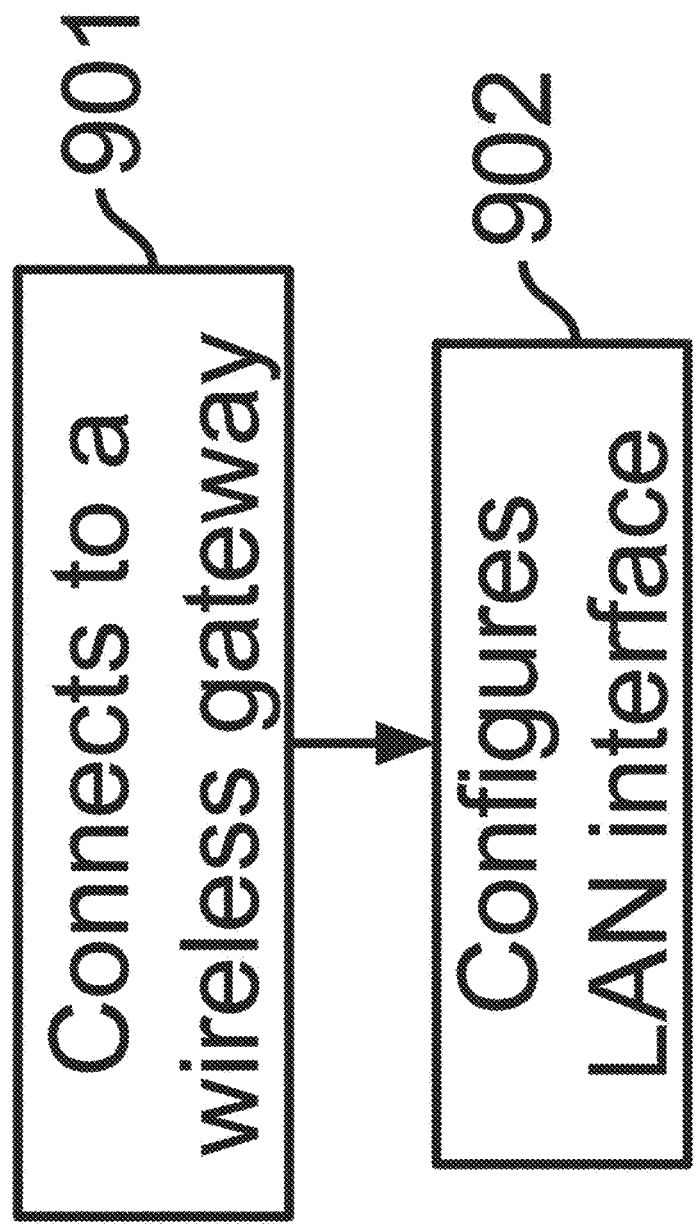
FIG. 9 is a flowchart illustrating a process according to one of the embodiments of the present invention.

FIG. 9 is a flowchart illustrating a process according to one of the embodiments of the present invention. FIG. 9 is viewed in conjunction with FIG. 1A for better understanding of the embodiment.

In a networking environment, portable gateway 103 has LAN interfaces 110a and 110b in FIG. 1A. LAN interfaces 110a and 1110b are required to be configured for connecting devices 104a and 104b. Portable gateway 103 then allows devices 104a and 104b to connect through LAN interfaces 110a and 110b respectively.

In step 901, portable gateway 103 connects to a wireless gateway, such as wireless gateway 102a through connection 106.

In step 902, portable gateway 103 configures LAN interfaces 110a and 110b. In one variant, LAN interfaces 110a and 110b are configured by using Dynamic Host Configuration Protocol (DHCP). Portable gateway 103 is then allowed to dynamically assign IP addresses to devices 104a and 104b. In this variant, portable gateway 103 records respective IP addresses with respective MAC addresses of devices 104a and 104b. Portable gateway 103 then identifies devices 104a and 104b by using the respective MAC addresses. Portable gateway 103 further receives one or more IP data packets from devices 104 or 104b, and identifies a device from which the IP data packets are received. For example, the IP data packets are received from device 104a and portable gateway 103 identifies device 104a. Portable gateway 103 then responds to the received IP data packets to device 104a.

In another variant, portable gateway 103 configures LAN interfaces 110a and 110b by using NAT. Portable gateway 103 when configures WAN interface 109 with an IP address, the IP address is used for LAN The NAT is used to translate the IP addresses of devices 104a and 104b into the IP address configured in WAN interface 109 of portable gateway 103.

In this variant, port numbers of devices 104a and 104b are used as source port numbers. When an IP data packet is sent to portable gateway 103 from device 104a or 104b, port number of device 104a or 104b is used to be sent to portable gateway 103 with the IP data packet in IP header. Portable gateway 103 then identifies devices 104a and 104b by port numbers and responds to the received IP data to identified devices 104 and 104b.

FIG. 10 illustrates an embodiment of portable gateway 103 in FIG. 1A of the present invention. FIG. 10 is viewed in conjunction with FIG. 1A, FIG. 3 and FIG. 7B for better understanding. FIG. 10 may be a web page 1000 generated and stored by portable gateway 103.

Web page 1000 comprises input fields allowing configuration of a WAN interface, such as WAN interface 109 of portable gateway 103. Portable gateway 103 is allowed to forward web page 300 to any of the devices, such as devices 104a and 104b.

Web page 1000 may be a compilation of web page 300 of FIG. 3 and web page 700 of FIG. 78. Web page 1000 then carries the scopes and the features of web pages 300 and 700 to configure a WAN interface, such as WAN interface 109 of portable gateway 103.

Web page 1000, titled with "WAN Configuration Portal", may be a designed website which brings accessibility from portable gateway 103 to any of the devices 104a and 104b through connections 107 and 108 respectively The user of device 104a or 104b is then able to access web page 1000 through any web browser, such as Firefox, Chrome etc.

In this embodiment, web page 1000 is a combination of fields of web page 300 and fields of web page 700. Fields of web page 300 are viewed in window 1001, named after 'Available Connection'. Fields of web page 700 are viewed in window 1002, named after 'WPS Connection'. Connection 1010, Connection 1011 and Connection 1012 are fields in window 1001, and Push Button 1013, Enter Wireless Gateway PIN 1014 and Portable Gateway PIN 1015 are fields in window 1002 of FIG. 10.

Connection 1010, Connection 1011 and Connection 1012 of FIG. 10 are identical to Connections 301, Connection 302 and Connection 303 of FIG. 3 respectively.

Push Button 1013, Enter Wireless Gateway PIN 1014 and Portable Gateway PIN 1015 of FIG. 10 are identical to Push Button 700a, Enter Wireless Gateway PIN 700b and Portable Gateway PIN 700c of FIG. 7B respectively.

FIG. 1B illustrates a network topology according to one embodiment of the present invention. FIG. 1B is viewed in conjunction with FIG. 1A for better understanding. Portable gateway 113 has a plurality of WAN interfaces, such as WAN interfaces 119a and 119b. Portable gateway 113 is then configured to connect to a plurality of wireless gateways, such as wireless gateways 121 and 122. Portable gateway 113 connects to wireless gateways 121 and 122 through WAN interfaces 119a and 119b respectively by using a plurality of connections, such as connection 120a and 120b.

Portable gateway 113 has a plurality of LAN interfaces, such as LAN interfaces 112a and 112b. A plurality of devices, such as devices 114a and 114b are allowed to connect to portable gateway 113 through LAN interfaces 112a and 112b.

Server 123 may be a network server which is used as the central repository of data and various programs that are shared by users in a network. Server 123 is connected to internet 111 through connection 124. There is no limitation on the number of server 123 and number of connection 124. Connection 124 is identical to connection 105a, 105b or 105c.

In this embodiment, portable gateway 113 is similar to portable gateway 103. Here, portable gateway 113 has more than one WAN interface. WAN interfaces 119a and 119b are identical to WAN interface 109. WAN interfaces 119a and 119b may be configured by using Wi-Fi as WAN for any Wi-Fi connection. There is no limitation on the number of WAN interfaces 119a and 119b in portable gateway 113.

LAN interfaces 112a and 112b are identical to 110a and 110b. There is no limitation on the number of LAN interfaces 112a and 112b in portable gateway 113.

Internet 111 is identical to internet 101 of FIG. 1A. Wireless gateways 121 and 122 are identical to wireless gateway 102a. Antenna 125a of wireless gateway 121 and antenna 125b of wireless gateway 122 are identical to antenna 111a of wireless gateway 102a, devices 114a and 114b are identical to devices 104a and 104b.

Connections 115 and 116 are identical to connection 105a, 105b or 105c. Connections 120a and 120b are identical to connection 106. Connections 117 and 118 are identical to connection 108.

Devices 114a and 114b are connected to portable gateway 113 through connections 117 and 118 respectively by using LAN interfaces 112a and 112b respectively.

In this embodiment, once portable gateway 113 configures WAN interfaces 119a and 119b, portable gateway 113 connects to wireless gateways 121 and 122 through connections 120a and 120b respectively. Portable gateway 113 then gets access to internet 111 through wireless gateways 121 and 122. Portable gateway 113 then gets access to server 123 through internet 111.

It should be noted that, a person having ordinary skill in the art would appreciate that, if one of the WAN interfaces 119a and 119b is configured then remaining WAN will only be configured. For example, if WAN interface 119a is configured, then WAN interface 119b will only be configured.

In one variant, when portable gateway 113 configures WAN interfaces 119a and 119b, portable gateway 113 aggregates connections 120a and 120b. A detailed description is described later according to FIG. 1C.

FIG. 1C illustrates a network topology according to one embodiment of the present invention. FIG. 1C is viewed in conjunction with FIG. 1B for better understanding. Portable gateway 133 has a plurality of WAN interfaces, such as WAN interfaces 139a and 139b. Portable gateway 133 is then configured to connect to a plurality of wireless gateways, such as wireless gateways 144 and 145. Portable gateway 133 connects to wireless gateways 144 and 145 through WAN interfaces 139a and 139b respectively by using a plurality of connections, such as connection 130a and 130b.

Portable gateway 133 has a plurality of LAN interfaces, such as LAN interfaces 132a and 132b. A plurality of devices, such as 134a and 134b are allowed to connect to portable gateway 133 through LAN interfaces 132a and 132b.

In this embodiment, portable gateway 133 is identical to portable gateway 113. WAN interfaces 139a and 139b of portable gateway 213 are identical to WAN interfaces 119a and 119b of portable gateway 113. WAN interfaces 119a and 119b may be configured by using Wi-Fi as WAN for any Wi-Fi connection.

LAN interfaces 132a and 132b are identical to 112a and 112b. There is no limitation on the number of LAN interfaces 132a and 132b in portable gateway 213.

Internet 131 is identical to internet 111. Wireless gateways 144 and 145 are identical to wireless gateways 121 and 122. Antenna 150a of wireless gateway 144 and antenna 150b of wireless gateway 145 are identical to antenna 125a of wireless gateway 121 and antenna 125b of wireless gateway 122, devices 134a and 134b are identical to devices 114a and 114b.

Connections 135 and 136 are identical to connections 115 and 116. Connections 130a and 130b are identical to connections 120a and 120b. Connections 137 and 138 are identical to connections 117 and 118.

Devices 134a and 134b are connected to portable gateway 133 through connections 137 and 138 respectively by using LAN interfaces 132a and 132b respectively.

In this embodiment, network node 140 may be either a redistribution point or a communication endpoint. Network node 140 may have WAN interfaces 141a and 141b. There is no limitation on the number of WAN interfaces 141a and 141b in network node 223. Network node 140 connects to internet 131 through WAN interfaces 141a and 141b by using connections 142 and 143. Connections 141 and 142 are identical to connections 215 and 216.

Portable gateway 133 then configures WAN interfaces 139a and 139b as portable gateway 113 configures WAN interfaces 119a and 119b. In this embodiment, once portable gateway 133 configures WAN interfaces 139a and 139b, connections 130a and 130b may be aggregated along with connections 142 and 143 respectively through connections 135 and 136 respectively. An aggregated connection may then be established between portable gateway 133 and network node 140.

In aggregation of connections between portable gateway 133 and network node 140, 'SpeedFusion' technology may need to be deployed into portable gateway 133 and network node 140. 'SpeedFusion' technology is described in U.S. Pat. No. 9,019,827; application Ser. No. 12/646,774; filed on Dec. 23, 2009; and entitled "Throughput Optimization for Bonded Variable Bandwidth Connections", which is owned by Pismo Labs Technology Limited.

FIG. 11 illustrates an embodiment of portable gateways 113 and 213 in FIGS. 18 and 1C respectively of the present invention. FIG. 11 describes a web page 1100 generated and stored by portable gateways 113 and 213 in FIGS. 18 and 1C respectively. FIG. 11 is viewed in conjunction with FIG. 10. FIG. 1B and FIG. 1C for better understanding.

Web page comprises input fields allowing configuration of a plurality of WAN interfaces, such as WAN interfaces 119a and 119b of portable gateway 113 in FIG. 1B, and WAN interfaces 139a and 139b of portable gateway 133 in FIG. 1C Web page 1100, titled with "WAN Configuration Portal", may be a designed website which brings accessibility from portable gateway 113 to any of the devices 114a and 114b through connections 117 and 118 respectively in FIG. 1B. The user of device 104a or 104b is then be able to access web page 1100 through any web browser, such as Firefox, Chrome etc.

In this embodiment, window 1101 is named after 'Available Wi-Fi SSID'. Window 1102 is identical to window 1002 of FIG. 10. Window 1102 is named after 'WPS Connection'.

SSID 1120, SSID 1121 and SSID 1122 of FIG. 11 are fields in window 1101. SSID 1120, SSID 1121 and SSID 1122 are wireless connections.

Push Button 1123. Enter Wireless Gateway PIN 1124 and Portable Gateway PIN 1125 of FIG. 11 are identical to Push Button 1013, Enter Wireless Gateway PIN 1014 and Portable Gateway PIN 1015 of FIG. 10 respectively.

Web page 1100 has fields WAN-1 1103, WAN-2 1104 and Connect 1105. In field WAN-1 1103, the user of device 114a or 114b enables WAN interface 119a of portable gateway 113, and WAN interface 139a of portable gateway 133. Portable gateway 113 then configures WAN interface 119a to connect to wireless gateway 121 through connection 120a, and portable gateway 133 configures WAN interface 139a to connect to wireless gateway 144 through connection 130a. In field WAN-2 1104, the user of device 114a or 114b, and the user of device 134a or 134b drags any of SSID 1120, SSID 1121, SSID 1122, Push Button 1123, Enter Wireless Gateway PIN 1124 and Portable Gateway PIN 1125. The user of device 114a or 114b then selects a connection for WAN interface 119b of portable gateway 113, and the user of device 134a or 134b selects a connection for WAN interface 139b of portable gateway 133. Further, the user of device 114a or 114b selects Connect 1105. Portable gateway 113 then configures WAN interfaces 119a and 119b to connect to wireless gateways 121 and 122 through connections 120a and 120b, and portable gateway 133 configures WAN interfaces 139a and 139b to connect to wireless gateways 144 and 145 through connections 130a and 130b.

In one embodiment, portable gateway 133 aggregates connections 130a and 130b according to FIG. 1C.

FIG. 12 is a block diagram illustrating the architecture of a portable gateway, such as portable gateway 1200, according to one of the embodiments of the present invention. Portable gateway 1200 may operate as any of the portable gateways 103, 113 and 133 of FIGS. 1A, 1B and 1C, respectively. Portable gateway 1200 comprises processor 1201, a primary storage 1202, a secondary storage 1204, WAN interfaces 1207 and 1208, and LAN interfaces 1205 and 1206. WAN interfaces 1207 and 1208 may be configured by using Wi-Fi as WAN for any Wi-Fi connection. There is no limitation on the number of WAN interfaces 1207 and 1208, and the number of LAN interfaces 1205 and 1206 in portable gateway 1200.

Portable gateway 1200 may take any number of physical forms, comprising for example, one of a plurality of discrete modules or cards within a larger network edge or hub device of the type well known in the art and may also comprise firmware, either alone or in combination with other hardware/software components. Alternatively, portable gateway 1200 may be a stand-alone device or module disposed at other computing device or network node, and may even include its own radio frequency (RF) front end (e.g., modulators, encryptors, etc.) or optical interface so as to interface directly with other computing devices and network nodes. Numerous other configurations may be used. Portable gateway 1200 may also be integrated with other types of components (such as mobile base stations, satellite transceivers, video set-top box, encoders/decoders, etc.) and form factors if desired.

Processor 1201 is implemented by using one or more central processing units, network processors, microprocessors, micro-controllers, Field Programmable Gate Array (FPGAs), Application-Specific Integrated Circuits (ASICs), or any device capable of performing instructions to perform the basic arithmetical, logical, and input/output operations of the system. Processor 1201 executes program instructions or code segments for implementing embodiments of portable gateway 1200.

Primary storage 1202 and secondary storage 1204 is implemented by using at least one of Dynamic Random Access Memory (DRAM), Synchronous Dynamic Random Access Memory (SDRAM), Static Random Access Memory (SRAM). Flash Random Access Memory (RAM), optical memory, magnetic memory, hard disk, and/or any non-transitory computer-readable media that are able to provide storage capability. The storage medium may include a number of software modules that can be implemented as software code to be executed by processor 1201 using any suitable computer instruction type. The software code may be stored as a series of instructions or commands, or as a program in the storage medium.

In one embodiment, secondary storage 1204 is a non-volatile storage. A non-volatile storage or static storage can be used for storing static information and instructions for processor 1201, as well as various system configuration parameters of a system of portable gateway 1200. Secondary storage 1204 can be configured to store a firmware. The firmware can be an operating system of portable gateway 1200.

Preferably, primary storage 1202 is implemented with DRAM, SDRAM and/or SRAM and is used as temporary storage or cache. Secondary storage 1204 is used to provide instructions to processor 1201, to provide storage to store identifiers, conditions, network performance statistics and other data to facilitate the operation of portable gateway 1200. Secondary storage 1204 is also used to store a computer file written in HTML or a comparable markup language which is used by processor 1201.

WAN interfaces 1207 and 1208, and LAN interfaces 1205 and 1206 are implemented using serial bus, universal serial bus (USB) parallel bus, a universal asynchronous receiver/transmitter (UART), Peripheral Component Interconnect (PCI), local bus, or other electronic components those are connecting technology to connect processor 1201 and an agent, which is used to be connected with optical fiber, cable, or antenna.

Processor 1201, primary storage 1202, secondary storage 1204, WAN interfaces 1207 and 1208, and LAN interfaces 1205 and 1206 are coupled to each other through system bus 1203

In one variant, one of the WAN interfaces 1207 and 1208, and one of the LAN interfaces 1205 and 1206 are connected with processor 1201 directly and the agent for connecting with optical fiber, cables or antenna connects directly with processor 1201.

In another variant, one of the WAN interfaces 1207 and 1208, and one of the LAN interfaces 1205 and 1206 connect to an Ethernet port for Ethernet network connection.

In another variant, one of the WAN interfaces 1207 and 1208, and one of the LAN interfaces 1205 and 1206 connect to a Wi-Fi adapter for Wi-Fi network connection In another variant, one of the WAN interfaces 1207 and 1208, and one of the LAN interfaces 1205 and 1206 connect to a USB port and the USB port may connect to an external modem for wireless WAN connection, such as a USB 3G modem, USB LTE modem, USB WiMax Modem, USB Wi-Fi Modem, or other modem for wireless communications.

In another variant, the WAN interfaces 1207 and 1208, and the LAN interfaces 1205 and 1206 connect to a plurality of USB ports for external modem connections.

In another variant, the WAN interfaces 1207 and 1208, and the LAN interfaces 1205 and 1206 connect to circuitry inside portable gateway 1200.

It should be noted that, a person having ordinary skill in the art would appreciate that, myriad other combinations and permutations of the foregoing may be possible in the present invention.

According to one of the embodiments of the present invention, portable gateway 1200 receives one or more IP data packets from LAN interfaces 1205 and/or 1206 for forwarding through WAN interfaces 1207 and/or 1208.

According to one of the embodiments of the present invention, processor 1201 of portable gateway 1200 searches the available connections for selecting a connection, such as connection 106 of FIG. 1A, connections 120*a* and/or 120*b* of FIG. 1B or connections 130*a* and/or 130*b* of FIG. 1C.

According to one of the embodiments of the present invention, processor 1201 of portable gateway 1200 determines if the received IP data packets are capable of being forwarded.

When the received IP data packets are capable of being forwarded, processor 1201 of portable gateway 1200 forwards the received IP data packets using the regular routing rules through WAN interfaces 1207 and/or 1208.

When the received IP data packets are not capable of being forwarded, processor 1201 of portable gateway 1200 generates responding IP data packets comprising the computer file written in HTML or a comparable markup language.

According to one of the embodiments of the present invention, processor 1201 of portable gateway 1200 sends the responding IP data packets to any of the LAN interfaces 1205 and 1206 from which the IP data packets are received. Further, the computer file written in HTML or a comparable markup language is viewed through any web browser, such as Firefox, Chrome etc in any devices, such as devices 104 and 104*b* of FIG. 1A, devices 114*a* and 114*b* of FIG. 1B, or devices 134*a* and 134*b* of FIG. 1C, connected to any of the LAN interfaces 1205 and 1206 of portable gateway 1200.

According to one of the embodiments of the present invention, processor 1201 of portable gateway 1200 selects a connection, such as connection 106 of FIG. 1A, connections 120*a* and/or 120*b* of FIG. 1B or connections 130*a* and/or 130*b* of FIG. 1C, from the available connections through which portable gateway 1200 can be connected to a wireless gateway, such as wireless gateway 120*a* of FIG. 1A, wireless gateways 121 and/or 121*b* of FIG. 1B, or wireless gateways 144 and/or 145 of FIG. 1C.

According to one of the embodiments of the present invention, processor 1201 of portable gateway 1200 receives information through the computer file written in HTML or a comparable markup language.

According to one of the embodiments of the present invention, processor 1201 of portable gateway 1200 configures WAN interfaces 1207 and/or 1208 according to the received instruction.

According to one of the embodiments of the present invention, processor 1201 of portable gateway 1200 stores the source address of the received IP data packet. Processor 1201 of portable gateway 1200 is then capable of sending the responding IP data packets according to the source address of the received IP data packet.

According to one of the embodiments of the present invention, processor 1201 of portable gateway 1200 stores information of connection at secondary storage 1204 or any other storage connected to portable gateway 1200.

According to one of the embodiments of the present invention, processor 1201 of portable gateway 1200 detects if a wireless gateway, such as wireless gateway 102*a* of FIG.

1A, wireless gateways 121 and/or 122 of FIG. 1B, or wireless gateways 221 and/or 222 of FIG. 1C are WPS-enabled.

According to one of the embodiments of the present invention, processor 1201 of portable gateway 1200 configures WAN interfaces 1207 and 1208 according to FIG. 1B.

In one variant, processor 1201 of portable gateway 1200 aggregates the connections connected to WAN interfaces 1207 and 1208 according to 'SpeedFusion' technology according to FIG. 1C.

According to one of the embodiments of the present invention, processor 1201 of portable gateway 1200 sends an IP data packet when connecting to a wireless gateway, such as wireless gateway 102a of FIG. 1A, wireless gateways 121 and/or 122 of FIG. 1B, or wireless gateways 221 and/or 222 of FIG. 1C. The IP data packets may be one or the first of the received IP data packets from LAN interfaces 1205 and/or 1206.

According to one of the embodiments of the present invention, processor 1201 of portable gateway 1200 configures LAN interfaces 1205 and 1206.

According to one of the embodiments of the present invention, processor 1201 of portable gateway 1200 starts sending and receiving IP data packets through WAN interfaces 1207 and 1208 via wireless gateway 102a of FIG. 1A, wireless gateways 121 and/or 122 of FIG. 1B, or wireless gateways 221 and/or 222 of FIG. 1C.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The invention claimed is:

1. A method of connecting to a wide area network (WAN) at a portable gateway through at least one gateway, wherein the portable gateway is connected to at least one device through a local area network (LAN), comprising:
   (a) generating a web page; wherein the web page comprises input fields allowing to configure at least one WAN interface of the portable gateway;
   (b) storing the web page;
   (c) receiving a first Internet Protocol (IP) data packet from at least one device for forwarding;
   (d) when the first IP data packet is not capable of being forwarded through the at least one WAN interface after receiving the first IP data packet from the at least one device, sending the web page to and displaying the web page at the at least one device;
   (e) receiving information from the at least one device through the web page;
   (f) configuring, based on the information, the at least one WAN interface; and
   (g) establishing, by using the information, at least one connection to connect to the at least one gateway through the at least one WAN interface to forward the first IP data packet through the at least one WAN interface via the at least one gateway;
   wherein:
   the web page is configured to display available connections in the at least one device and the available connections are reachable to the portable gateway; and
   the at least one connection is selected from the available connections to be established at step (g) according to a predefined scheme.

2. The method of claim 1, wherein:
   the web page is sent to the at least one device using one or more IP data packets; and
   the web page is a computer file written in a Hypertext Markup Language (HTML) or an extensible HyperText Markup Language (XHTML).

3. The method of claim 2, wherein the portable gateway stores the computer file in a storage of the portable gateway.

4. The method of claim 1, wherein the portable gateway is configured to detect if the at least one gateway is Wi-Fi Protected Setup (WPS) enabled.

5. The method of claim 1, wherein;
   the predefined scheme is based on one or more of the following: wireless frequency, radio signal strength, or geographical location; and
   the portable gateway comprises a plurality of WAN interfaces and configures the plurality of WAN interfaces.

6. The method of claim 5, wherein the portable gateway aggregates a plurality of connections established respectively using the plurality of WAN interfaces.

7. The method of claim 1, wherein:
   the web page is sent to the at least device at step (d) using one or more IP data packets; and
   the portable gateway sends a second IP data packet to the at least one gateway when step (d) is performed.

8. The method of claim 1, wherein the information includes one or more of the following: information of the at least one connection, information of the available connections, and user input.

9. The method of claim 8, wherein the information of the at least one connection is (i) obtained from an administrator of the at least one gateway or (ii) retrieved by the portable gateway when the information of the connection is stored previously.

10. The method of claim 1, wherein the portable gateway comprises a plurality of LAN interfaces and configures the plurality of LAN interfaces.

11. A portable gateway for connecting to a wide area network (WAN) through at least one gateway, wherein the portable gateway is connected to at least one device through a local area network (LAN), comprising:
   at least one processor;
   at least one network interface; and
   at least one non-transitory computer-readable storage medium;
   wherein the at least one non-transitory computer-readable storage medium stores program instructions executable by the at least one processor for:
   (a) generating a web page; wherein the web page comprises input fields allowing to configure at least one WAN interface of the portable gateway;
   (b) storing the web page;
   (c) receiving a first Internet Protocol (IP) data packet from at least one device for forwarding;
   (d) when the first IP data packet is not capable of being forwarded through the at least one WAN interface after receiving the first IP data packet from the at least one device, sending the web page to and displaying the web page at the at least one device;
   (e) receiving information from the at least one device through the web page;

(f) configuring, based on the information, the at least one WAN interface; and (g) establishing, by using the information, at least one connection to connect to the at least one gateway through the at least one WAN interface via at least one connection to forward the first IP data packet through the at least one WAN interface via the at least one gateway;

wherein:

the web page is configured to display available connections in the at least one device and the available connections are reachable to the portable gateway; and the at least one connection is selected from the available connections to be established at step (g) according to a predefined scheme.

12. The portable gateway of claim 11, wherein:

the web page is sent to the at least one device using one or more IP data packets; and the web page is a computer file written in a Hypertext Markup Language (HTML) or an extensible HyperText Markup Language (XHTML).

13. The portable gateway of claim 12, wherein the portable gateway stores the computer file in a storage of the portable gateway.

14. The portable gateway of claim 11, wherein the portable gateway is configured to detect if the at least one gateway is Wi-Fi Protected Setup (WPS) enabled.

15. The portable gateway of claim 11, wherein:

the predefined scheme is based on one or more of the following: wireless frequency, radio signal strength, or geographical location; and the portable gateway comprises a plurality of WAN interfaces and configures the plurality of WAN interfaces.

16. The portable gateway of claim 15, wherein the portable gateway aggregates a plurality of connections established respectively using the plurality of WAN interfaces.

17. The portable gateway of claim 11, wherein:

the web page is sent to the at least device at step (d) using one or more IP data packets; and the portable gateway sends a second IP data packet to the at least one gateway when step (d) is performed.

18. The portable gateway of claim 11, wherein the information includes one or more of the following: information of the at least one connection, information of the available connections, and user input.

19. The portable gateway of claim 18, wherein the information of the at least one connection is (i) obtained from an administrator of the at least one gateway or (ii) retrieved by the portable gateway when the information of the connection is stored previously.

20. The portable gateway of claim 11, wherein the portable gateway comprises a plurality of LAN interfaces and configures the plurality of LAN interfaces.

* * * * *